US 6,725,650 B2

(12) United States Patent
Nishimura

(10) Patent No.: US 6,725,650 B2
(45) Date of Patent: Apr. 27, 2004

(54) EXHAUST GAS PURIFYING SYSTEM FOR ENGINE

(75) Inventor: Hirofumi Nishimura, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 09/932,449

(22) Filed: Aug. 20, 2001

(65) Prior Publication Data

US 2002/0100272 A1 Aug. 1, 2002

(30) Foreign Application Priority Data

Aug. 22, 2000 (JP) ........................................ 2000-250584
Sep. 12, 2000 (JP) ........................................ 2000-275916

(51) Int. Cl.[7] .............................................. F01N 3/00
(52) U.S. Cl. ............................ 60/285; 60/276; 60/286
(58) Field of Search ........................ 60/274, 276, 285, 60/301, 286

(56) References Cited

U.S. PATENT DOCUMENTS

| | | | | |
|---|---|---|---|---|
| 5,956,942 A | * | 9/1999 | Sebastiano et al. | 60/274 |
| 5,970,707 A | * | 10/1999 | Sawada et al. | 60/285 |
| 5,983,627 A | | 11/1999 | Asik | |
| 6,101,809 A | * | 8/2000 | Ishizuka et al. | 60/276 |
| 6,119,452 A | * | 9/2000 | Kinugasa et al. | 60/285 |
| 6,138,453 A | * | 10/2000 | Sawada et al. | 60/285 |
| 6,173,570 B1 | | 1/2001 | Mitsumoto et al. | |
| 6,244,047 B1 | * | 6/2001 | Brehob et al. | 60/285 |
| 6,336,320 B1 | * | 1/2002 | Tanaka et al. | 60/285 |

FOREIGN PATENT DOCUMENTS

| | | |
|---|---|---|
| DE | 199 48 073 A1 | 6/2000 |
| EP | 0 930 425 A2 | 7/1999 |
| JP | 11-200853 | 7/1999 |
| JP | 11-247654 | 9/1999 |

OTHER PUBLICATIONS

Partial European Search Report Dated Aug. 5, 2003.

* cited by examiner

Primary Examiner—Thomas Denion
Assistant Examiner—Tu M. Nguyen
(74) Attorney, Agent, or Firm—Nixon Peabody LLP; Donald R. Studebaker

(57) ABSTRACT

An exhaust purifying system includes switching between a stratified combustion state at a stratified combustion region (I) of low revolutions speeds and low loads and a homogeneous combustion state of substantially the theoretical air/fuel ratio at a warm $\lambda=1$ region (II) adjacent thereto with higher revolution speeds or loads, wherein a first oxygen concentration sensor is arranged upstream from the three-way catalyst, and when an engine shifts from the stratified combustion region (I) to the warm $\lambda=1$ region (II), the feedback control of the air/fuel ratio based on an output signal of that sensor begins, and the target air/fuel ratio A/F is set to a range of $14.0 \leq A/F < 14.7$, so that the target air/fuel ratio A/E is slightly richer than the theoretical air/fuel ratio, thus preventing a temporary deterioration of the exhaust gas state.

7 Claims, 14 Drawing Sheets

EXHAUST GAS PURIFYING SYSTEM FOR ENGINE

BACKGROUND OF THE INVENTION

The present invention relates to exhaust gas purifying systems for engines, which are provided with a catalyst displaying a three-way purification function when at least the exhaust gas is in a state corresponding substantially to a theoretical air/fuel ratio, and in which the engine is ordinarily switched between an operating state in which the air/fuel ratio in the combustion chamber is lean and an operating state in which it is substantially at the theoretical air/fuel ratio or richer than that.

Conventionally, as exhaust gas purifying systems for this kind of engine, systems are known, in which a so-called three-way catalyst is arranged in the exhaust duct of the engine, and an NOx absorbing/reducing catalyst including an NOx absorbing material is arranged nearby on the downstream side, as disclosed for example in Japanese Laid-Open Patent Publication (Tokkai) No. 11-200853. For the NOx absorbing material, it is possible to use, for example, an alkaline earth metal such as barium, and when the air/fuel ratio of the exhaust gas is in a predetermined lean state, that is, in an oxygen-rich atmosphere with an oxygen concentration of, for example, at least 4% in the exhaust gas, the NOx in the exhaust gas is oxidized, and absorbed as nitrate, whereas when the oxygen concentration drops, the absorbed nitrate undergoes a substitution reaction with the CO in the exhaust gas, and NOx is released, while the CO is absorbed as carbonate.

When the air/fuel ratio of the exhaust gas is in the lean state, the NOx in the exhaust gas is absorbed by the above-mentioned NOx absorbing material, and the exhaust gas is purified. Furthermore, when the engine is operated substantially at the theoretical air/fuel ratio, and the air/fuel ratio of the exhaust gas is in a state corresponding substantially to the theoretical air/fuel ratio, that is, when the oxygen concentration is about 0.5 to 1% or lower, almost all of the HC, CO and NOx in the exhaust gas is purged due to the three-way purification function of the catalyst, and the NOx released from the NOx absorbing material reacts with the HC and CO, and reduction purification is performed.

Moreover, the NOx absorbing material has the property that, as the amount of absorbed NOx increases, the ability of the NOx absorbing material to absorb NOx decreases, so that in the above conventional example, when the engine shifts from an operating state with a lean air/fuel ratio to an operating state at substantially the theoretical air/fuel ratio, the air/fuel ratio is enriched considerably for a short time, that is, in spike-form, thus promoting the release of NOx.

Like the NOx absorbing/reducing catalyst, the so-called three-way catalyst, which displays a three-way purification function when the air/fuel ratio of the exhaust gas is in a state corresponding substantially to the theoretical air/fuel ratio, generally includes an oxygen absorbing material, such as ceria ($CeO_2$). This oxygen absorbing material has the property that it absorbs oxygen in the exhaust gas when the oxygen concentration is larger than a certain level (for example 0.5%), and releases oxygen when the oxygen concentration is lower than that value, so that the variations of the oxygen concentration in the exhaust gas are dampened, and the three-way purification function can be increased.

However, when a three-way catalyst and an NOx absorbing/reducing catalyst are arranged in series in the exhaust duct of the engine, as in the above conventional example, and the air/fuel ratio of the exhaust gas is changed from a lean state to a state corresponding substantially to the theoretical air/fuel ratio, then oxygen is released from the oxygen absorbing material included in the catalysts, so that the air/fuel ratio shifts locally toward the lean side in the vicinity of the two catalysts, and the HC and CO in the exhaust gas are used up by reacting with the oxygen, and eventually it becomes impossible to release NOx efficiently from the NOx absorbing/reducing catalyst located downstream.

Regarding this aspect, the above conventional example estimates the amount of oxygen released by the three-way catalyst by considering the operation history of the engine and the oxygen absorbing capability in the three-way catalyst, anticipates that HC or CO are consumed by reacting with the oxygen, and enriches the air/fuel ratio in the combustion chamber considerably so that a sufficient amount of HC and Co are supplied to the downstream NOx absorbing/reducing catalyst.

However, in the above-described conventional exhaust gas purifying system, when the air/fuel ratio in the combustion chamber of the engine is switched from the lean state to the state of substantially the theoretical air/fuel ratio, the amount of injected fuel increases spike-like for a short time, enriching the air/fuel ratio considerably, so that as described above, even when increasing the HC and CO in the exhaust gas to match the amount of oxygen released by the catalyst, in actuality, a lot of the HC and CO are blown through the catalyst and are emitted into the atmosphere.

Thus, the HC and CO emitted into the atmosphere increases sharply, even if only temporarily, and the condition of the exhaust gas deteriorates. Moreover, the oxygen released by the catalysts may not react sufficiently with the HC and CO, whereby in the vicinity of the catalysts, the air/fuel ratio of the exhaust gas shifts to the leaner side, leaving the appropriate air/fuel ratio range for displaying the three-way purification function, and there is the risk that the catalysts' property of purifying the exhaust gas drops.

Therefore, with the foregoing in mind, it is an object of the present invention to provide an exhaust gas purifying system for an engine, in which a catalyst having a three-way purification function is provided in an exhaust duct, and in which the engine is usually switched between an operating state of lean air/fuel ratio and an operating state with an air/fuel ratio of substantially the theoretical air/fuel ratio or richer than that, wherein a temporary deterioration of the state of the exhaust gas caused by emission of oxygen from the catalyst can be prevented, while suppressing deterioration of the total fuel efficiency when considered for all operating regions.

SUMMARY OF THE INVENTION

In order to attain these objects, when the engine has shifted from an operating state with lean air/fuel ratio to an operating state with richer air/fuel ratio, the control target value of the air/fuel ratio is corrected to be slightly richer than the theoretical air/fuel ratio, so as to match the resulting enrichment of the air/fuel ratio with the pace in which oxygen is released from the catalyst.

More specifically, in accordance with a first aspect of the present invention, an exhaust gas purifying system for an engine includes a catalyst displaying a three-way purification function when an air/fuel ratio state of at least an exhaust gas corresponds substantially to a theoretical air/fuel ratio; a first air/fuel ratio control means for controlling an air/fuel ratio in a combustion chamber of the engine by switching to either a state that is leaner than the theoretical air/fuel ratio or a state that is richer than that, depending on the operating state of the engine; and an air/fuel ratio correction means for correcting the air/fuel ratio in the combustion chamber temporarily to a state that is even richer, when the first air/fuel ratio control means switches the air/fuel ratio in the combustion chamber from a lean state to a richer state. When the air/fuel ratio in the combustion chamber has been switched from a lean state to a richer state, the air/fuel ratio correction means sets the air/fuel ratio in the combustion chamber to a state that is slightly richer than the theoretical air/fuel ratio, so as to match a release of oxygen from the catalyst.

With this configuration, first, when the engine is in an operating state with lean air/fuel ratio, the exhaust gas from the engine is in a state of high oxygen concentration, so that a portion of the oxygen in the exhaust gas is gradually absorbed by the catalyst. Then, when the operating state of the engine changes and the air/fuel ratio in the combustion chamber is switched by the first air/fuel ratio control means to a state in which the air/fuel ratio is richer than in the lean state, the air/fuel ratio in the combustion chamber is temporarily corrected to an even richer state by the air/fuel ratio correction means.

In this situation, the air/fuel ratio in the combustion chamber is corrected by the air/fuel ratio correction means to a state that is slightly richer than the theoretical air/fuel ratio so as to match the release of oxygen from the catalyst, so that the air/fuel ratio state of the exhaust gas from the combustion chamber of the engine becomes a state of a slightly richer (lower) oxygen concentration than in the state corresponding to the theoretical air/fuel ratio. This cancels the influence of the oxygen release from the catalyst, thus maintaining the local air/fuel ratio state in the vicinity of the catalyst in a state corresponding to substantially the theoretical air/fuel ratio. Thus, the three-way purification performance of the catalyst can be maintained reliably. Moreover, there is no spike-like enrichment of the air/fuel ratio state of the exhaust gas as in the related art (JP H11-200853), so that HC and CO in the exhaust gas are not blown through the catalyst.

The exhaust gas purifying system for an engine according to a second aspect of the present invention further includes a detection means for detecting concentration of a predetermined component of the exhaust gas upstream from the catalyst. Furthermore, the first air/fuel ratio control means controls the air/fuel ratio in the combustion chamber to a state that is leaner than the theoretical air/fuel ratio when the engine is in a predetermined operating region of low revolution speeds and low loads, and feedback controls the air/fuel ratio in the combustion chamber to a target value A/F near the theoretical air/fuel ratio, based on a signal from the detection means, when the engine is in a preset operating region of higher revolution speeds and/or higher loads than that predetermined operating region. Additionally, when the engine has shifted from the predetermined operating region to the preset operating region, the air/fuel ratio correction means sets the target value A/F of the air/fuel ratio feedback control with the first air/fuel ratio control means within a range of $14.0 \leq A/F < 14.7$, until a predetermined air/fuel ratio correction period has passed.

With this aspect of the present invention, first, the air/fuel ratio control means controls the air/fuel ratio in the combustion chamber to a state that is leaner than the theoretical air/fuel ratio when the engine is in a predetermined operating region of low revolution speeds and low loads. In this situation, the exhaust gas is in a state of high oxygen concentration, so that a portion of the oxygen in the exhaust gas is gradually absorbed by the catalyst. Then, when the engine shifts from the predetermined operating region to the preset operating region, the air/fuel ratio correction means sets the target value A/F of the air/fuel ratio feedback control with the first air/fuel ratio control means within a range of at least 14.0 and less than 14.7, that is, slightly richer than the theoretical air/fuel ratio, until a predetermined air/fuel ratio correction period has passed.

Thus, the air/fuel ratio state of the exhaust gas becomes slightly richer than in the state corresponding to the theoretical air/fuel ratio, that is, a state in which the oxygen concentration is low, and this drop of the oxygen concentration cancels the influence of the oxygen release by the catalyst, so that the local air/fuel ratio state in the vicinity of the catalyst is maintained in a state corresponding substantially to the theoretical air/fuel ratio. Moreover, the state of the air/fuel ratio of the exhaust gas is not enriched spike-like, so that the HC and CO in the exhaust gas are not blown through the catalyst.

That is to say, the oxygen released from the catalyst is reacted in just the right amount with the HC and CO in the exhaust gas, preventing a deterioration of the state of the exhaust gas due to blowing through of HC or CO, and maintaining a stable three-way purification performance of the catalyst.

The exhaust gas purifying system for an engine according to a third aspect of the present invention further includes a detection means for detecting concentration of a predetermined component of the exhaust gas upstream from the catalyst. Furthermore, the first air/fuel ratio control means basically controls the air/fuel ratio in the combustion chamber to a state that is leaner than the theoretical air/fuel ratio when the engine is in a predetermined operating region of low revolution speeds and low loads, and feedback controls the air/fuel ratio in the combustion chamber to a target value A/F near the theoretical air/fuel ratio, based on a signal from the detection means, when the engine has entered a preset specified operating state in the predetermined operating region. Moreover, when the engine has entered the specified operating state in the predetermined operating region, the air/fuel ratio correction means sets the target value A/F of the air/fuel ratio feedback control with the air/fuel ratio control means within a range of $14.0 \leq A/F < 14.7$, until a predetermined air/fuel ratio correction period has passed.

Thus, when the engine has entered a specified operating state in the predetermined operating region with low revolution speeds and low loads, that is, when for example the engine has shifted from a normal operating state to an accelerating operating state, a similar operational effect as in the second aspect of the present invention can be attained.

The exhaust gas purifying system for an engine according to a fourth aspect of the present invention further includes an oxygen absorption amount estimation means for estimating the amount of oxygen absorbed by catalyst when the engine is in the predetermined operating region, and a correction period setting means for setting a length of the air/fuel ratio correction period in accordance with a value estimated by the oxygen absorption amount estimation means.

Thus, the length of the air/fuel ratio correction period is modified by the correction period setting means in accordance with the amount of oxygen absorbed by the catalyst, so that, for example, when the engine has shifted from the predetermined operating region to the preset operating region, the air/fuel ratio state of the exhaust gas is suitably enriched continuously while oxygen is being released from the catalyst, thereby sufficiently attaining the operational effects of the first to third aspects of the present invention.

According to the fifth aspect of the present invention, the exhaust gas purifying system for an engine according to the fourth aspect of the present invention further includes a correction prohibiting means for prohibiting corrective control of the air/fuel ratio with the air/fuel ratio correction means when the value estimated by the oxygen absorption amount estimation means is not greater than a predetermined value.

Thus, when the amount of oxygen absorbed by the catalyst is not greater than a predetermined value and very small, the amount of oxygen released by the catalyst is very small too, so that in this situation, its adverse effect is very small, and improvement of the fuel efficiency can be better attained by not performing a correction of the air/fuel ratio to the richer side.

In the exhaust gas purifying system for an engine according to a sixth aspect of the present invention, the catalyst is an NOx catalyst including an NOx absorbing material that absorbs NOx in the exhaust gas in an oxygen-rich atmosphere, and releases absorbed NOx when the oxygen concentration has dropped.

Thus, when the engine is in a predetermined operating region, and the air/fuel ratio in the combustion chamber is in a state that is leaner than the theoretical air/fuel ratio, the NOx in the exhaust gas of the oxygen-rich atmosphere is absorbed by the NOx absorbing material, and the exhaust gas is purified. Furthermore, if the engine is in a preset operating region, and the air/fuel ratio in the combustion chamber is substantially the theoretical air/fuel ratio, then the NOx is released by the NOx absorbing material, but this NOx reacts with the HC and the CO in the exhaust gas, and is reduction purified.

According to the seventh aspect of the present invention, in the exhaust gas purifying system for an engine according to a sixth aspect of the present invention, a three-way catalyst is arranged in an exhaust duct upstream from the NOx catalyst, an oxygen concentration sensor for detecting oxygen concentration in the exhaust gas is arranged in the exhaust duct between the two catalysts, and the air/fuel ratio correction period is the period until the oxygen concentration detected by the oxygen concentration sensor has dropped to a preset value or lower.

That is to say, if a three-way catalyst and an NOx catalyst are arranged in order from the upstream side in the exhaust duct of the engine, then, when the air/fuel ratio in the combustion chamber of the engine shifts from a lean state to substantially the theoretical air/fuel ratio, there is the risk that the release and reduction purification of the NOx from the NOx absorbing material in the downstream NOx catalyst is impeded by the release of oxygen from the upstream three-way catalyst.

With the present invention, on the other hand, an oxygen concentration sensor is arranged downstream from the three-way catalyst, and until it is detected by the output of this oxygen concentration sensor that the oxygen concentration in the exhaust gas has dropped to or below a predetermined value, the correction to the rich side of the air/fuel ratio is continued. Thus, while oxygen is actually released from the three-way catalyst on the upstream side in the exhaust duct, the air/fuel ratio in the combustion chamber is enriched accordingly, and when no more oxygen is released from the three-way catalyst, the enriching correction of the air/fuel ratio is terminated. Thus, the adverse effect due to the oxygen release from the three-way catalyst is eliminated, and the release and reduction purification of NOx from the NOx absorbing material in the downstream NOx catalyst is suitably promoted.

In the exhaust gas purifying system for an engine according to an eighth aspect of the present invention, the catalyst is a three-way catalyst, the exhaust gas purifying system further includes a detection means for detecting concentration of a predetermined component of the exhaust gas upstream from the three-way catalyst, and an NOx catalyst having an NOx absorbing material that absorbs NOx in the exhaust gas in an oxygen-rich atmosphere and releases absorbed NOx when the oxygen concentration drops is arranged in an exhaust duct downstream from the three-way catalyst. Furthermore, an oxygen concentration sensor for detecting oxygen concentration in the exhaust gas is arranged in the exhaust duct between the three-way catalyst and the NOx catalyst. The first air/fuel ratio control means controls the air/fuel ratio in the combustion chamber to a state that is leaner than the theoretical air/fuel ratio when the engine is in a predetermined operating region of low revolution speeds and low loads, and controls the air/fuel ratio in the combustion chamber to substantially the theoretical air/fuel ratio, when the engine is in a preset operating region of higher revolution speeds and/or higher loads than that predetermined operating region. When the engine has shifted from the predetermined operating region to the preset operating region, the air/fuel ratio correction means corrects the target value of the air/fuel ratio control with the first air/fuel ratio control means to be richer than the theoretical air/fuel ratio, based on a signal from the oxygen concentration sensor, until a predetermined air/fuel ratio correction period has passed.

Thus, as in the second aspect of the present invention, when the engine has shifted to a preset region from a predetermined operating region with low revolution speeds and low loads, the air/fuel ratio correction means corrects the air/fuel ratio in the combustion chamber to a state that is slightly richer than the theoretical air/fuel ratio, canceling the release of oxygen from the three-way catalyst on the upstream side of the exhaust duct, so that the air/fuel ratio state of the exhaust gas in the vicinity of the three-way catalyst and the NOx catalyst is maintained at a suitable state that is obtained by the three-way purification function, and the release and reduction purification of the NOx from the NOx absorbing material in the NOx catalyst is suitably promoted, while preventing a deterioration of the exhaust gas state.

Moreover, in this situation, the oxygen concentration sensor is arranged between the three-way catalyst and the NOx catalyst, and based on the output from this oxygen concentration sensor, the air/fuel ratio correction means corrects the air/fuel ratio towards the richer side, so that the air/fuel ratio is suitably corrected in accordance with the release condition of the oxygen from the three-way catalyst.

In the exhaust gas purifying system for an engine according to a ninth aspect of the present invention, the catalyst is a three-way catalyst, the exhaust gas purifying system further including a detection means for detecting concentration of a predetermined component of the exhaust gas upstream from the three-way catalyst, and an NOx catalyst having an NOx absorbing material that absorbs NOx in the exhaust gas in an oxygen-rich atmosphere, and releases absorbed NOx when the oxygen concentration drops is arranged in an exhaust duct downstream from the three-way catalyst. Furthermore, an oxygen concentration sensor for detecting oxygen concentration in the exhaust gas is arranged in the exhaust duct between the three-way catalyst and the NOx catalyst. Also, the first air/fuel ratio control means basically controls the air/fuel ratio in the combustion chamber to a state that is leaner than the theoretical air/fuel ratio when the engine is in a predetermined operating region of low revolution speeds and low loads, and switches the air/fuel ratio in the combustion chamber to substantially the theoretical air/fuel ratio, when the engine enters a preset specified operating state in the predetermined operating region. When the engine enters the specified operating state in the predetermined operating region, the air/fuel ratio correction means corrects the target value of the air/fuel ratio control with the first air/fuel ratio control means to be richer than the theoretical air/fuel ratio, based on a signal from the oxygen concentration means, until a predetermined air/fuel ratio correction period has passed.

Thus, when the engine has entered a specified operating state in the predetermined operating region of low revolution speeds and low loads, that is, when for example the engine has shifted from a normal operating state to an accelerating operating state, or when the oxygen concentration in the exhaust gas is intentionally decreased in order to release and reduction purify NOx from the NOx absorbing material of the NOx catalyst, a similar operational effect as in the eighth aspect of the present invention can be attained.

According to the tenth aspect of the present invention, in the exhaust gas purifying system for an engine according to a eighth or ninth aspect of the present invention, the air/fuel ratio correction means is configured so as to terminate the correction control of the air/fuel ratio when the oxygen concentration in the exhaust gas detected by the oxygen concentration sensor has dropped to a preset value or lower.

Thus, while oxygen is actually released from the three-way catalyst, it is possible to reliably continue the correction of the air/fuel ratio accordingly.

Furthermore, the exhaust gas purifying system for an engine according to any of the eleventh to sixteenth aspect of the present invention focuses on the fact that in particular when the engine is installed in a vehicle, under regular operating conditions, the frequency in which the engine is in a rich operating state near the theoretical air/fuel ratio is relatively low, and in this regular condition, the target value of the air/fuel ratio near the theoretical air/fuel ratio is set to a value that is relatively richer than outside the regular condition, that is under a predetermined condition.

That is to say, in the exhaust gas purifying system for an engine according to a eleventh aspect of the present invention, a detection means for detecting concentration of a predetermined component of the exhaust gas is arranged in an exhaust duct upstream from the three-way catalyst, the first air/fuel ratio control means controls the air/fuel ratio in the combustion chamber to a state that is leaner than the theoretical air/fuel ratio when the engine is in a predetermined operating region of low revolution speeds and low loads, and feedback controls the air/fuel ratio in the combustion chamber to a target value near the theoretical air/fuel ratio, based on a signal from the detection means, when the engine is in a preset operating region of higher revolution speeds and/or higher loads than that predetermined operating region, furthermore the exhaust gas purifying system is further provided with a second air/fuel ratio control means, which prohibits control with the first air/fuel ratio control means under a predetermined condition and when the engine is in the predetermined operating region or the preset operating region, and feedback-controls the air/fuel ratio in the combustion chamber to a target value near the theoretical air/fuel ratio, based on the signal from the detection means. The target value for feedback control of the air/fuel ratio with the first air/fuel ratio control means is set to a value that is richer than the control target value of the second air/fuel ratio control means.

Thus, under regular conditions, when the engine is in the predetermined operating region of low revolution speeds and low loads, the first air/fuel ratio control means controls the air/fuel ratio in the combustion chamber to a state that is leaner than the theoretical air/fuel ratio.

In this situation, the air/fuel ratio state of the exhaust gas is in a state of high oxygen concentration, so that the oxygen in the exhaust gas is absorbed by the catalyst.

Then, when the engine shifts to a preset operating region, the first air/fuel ratio control means feedback controls the air/fuel ratio in the combustion chamber to a target value near the theoretical air/fuel ratio. In this situation, also the air/fuel ratio state of the exhaust gas corresponds to substantially the theoretical air/fuel ratio, so that oxygen is released from the catalyst, but the target value of the air/fuel ratio feedback control is set to be accordingly richer, so that the air/fuel ratio state near the catalyst does not deviate considerably to the leaner side, and consequently, the three-way purification function of the catalyst is not harmed. Furthermore, the air/fuel ratio of the exhaust gas is not enriched spike-like, so that the HC and CO in the exhaust gas are not blown through the catalyst.

On the other hand, under a predetermined condition, the air/fuel ratio in the combustion chamber of the engine is controlled by the second air/fuel ratio control means to substantially the theoretical air/fuel ratio or a state that is richer than that, so that in this situation, no oxygen is absorbed by the catalyst. Therefore, under this predetermined condition, when the air/fuel ratio in the combustion chamber is feedback controlled to a target value near the theoretical air/fuel ratio, the control target value can be set to a relatively leaner side, thus achieving a decrease of the fuel consumption.

That is to say, this aspect of the present invention takes advantage of the fact that under normal conditions, the engine is mostly in an operating state with lean air/fuel ratio, and rarely in an operating state at the theoretical air/fuel ratio or richer than that, and the control target value for feedback controlling the air/fuel ratio to near the theoretical air/fuel ratio is set to be slightly richer than under the predetermined condition when oxygen accumulates in the catalyst, so that the air/fuel ratio is not enriched spike-like, and the oxygen released from the catalyst can be caused to react in just the right amount with the HC and the CO in the exhaust gas. Thus, it can be prevented that a portion of the HC and CO in the exhaust gas is blown through the catalyst, and the purification performance of the catalyst can be stabilized. Furthermore, since the engine is not frequently operated near the theoretical air/fuel ratio during normal conditions, the deterioration of the total fuel consumption when regarded over the entire operating region is small, even when the air/fuel ratio at that time is set on the rich side.

According to the twelfth aspect of the present invention, in the exhaust gas purifying system for an engine according to the eleventh aspect of the present invention, the predetermined condition is that the engine is in a not-yet warmed-up state.

Thus, in the not-yet warmed-up state, in which gasification/atomization of the fuel is difficult, the air/fuel ratio in the combustion chamber is controlled by the second air/fuel ratio control means to be substantially the theoretical air/fuel ratio or in a state richer than that, regardless of the operating state of the engine, thereby ensuring combustion stability of the engine.

According to the thirteenth aspect of the present invention, the exhaust gas purifying system for an engine according to the twelfth aspect of the present invention further includes a catalyst temperature state determination means for determining whether a temperature of the catalyst is lower than a preset temperature, and a target value correction means for correcting the target value of the air/fuel ratio feedback control with the second air/fuel ratio control means to a value that is leaner than the theoretical air/fuel ratio, when the catalyst temperature state determination means has determined that the catalyst is in a low-temperature state.

Thus, even when the engine is in the not-yet warmed-up state, when the catalyst is in a not-yet activated low temperature state, the target value of the air/fuel ratio feedback control is set to be leaner than the theoretical air/fuel ratio, and by reacting the oxygen in the exhaust gas with the unburned fuel, the heating of the catalyst can be promoted. It should be noted that even when the air/fuel ratio is slightly leaner than the theoretical air/fuel ratio, the combustion stability of the engine is not harmed.

According to the fourteenth aspect of the present invention, the exhaust gas purifying system for an engine according to the eleventh aspect of the present invention is further provided with a defect state determination means for determining when at least one of the first air/fuel ratio control means and the sensors and actuators that are necessary for executing control with the first air/fuel ratio control means is defective, and the predetermined condition is that a defect has been determined by the defect state determination means.

That is to say, when the control with the first air/fuel ratio control means cannot be performed properly, the control with the first air/fuel ratio is prohibited, and the control of the air/fuel ratio is carried out with the second air/fuel ratio control means.

According to the fifteenth aspect of the present invention, in the exhaust gas purifying system for an engine according to the twelfth or fourteenth aspect of the present invention, the target value of air/fuel ratio feedback control with the second air/fuel ratio control means is substantially the theoretical air/fuel ratio.

Thus, even when the engine is in the not-yet warmed-up state or a sensor or the like is defective, the catalyst displays the three-way purification function, and a high exhaust gas purification performance can be stably ensured, while maintaining the combustion stability of the engine.

According to the sixteenth aspect of the present invention, in the exhaust gas purifying system for an engine according to the eleventh aspect of the present invention, the catalyst is a three-way catalyst, and an NOx catalyst, which includes NOx absorbing material that absorbs NOx in the exhaust gas in an oxygen-rich atmosphere, and releases absorbed NOx when the oxygen concentration drops, is provided downstream from the three-way catalyst.

With this configuration, the engine is ordinarily in the predetermined operating region with low revolution speeds and low loads, and when the air/fuel ratio in the combustion chamber is controlled to a state that is leaner than the theoretical air/fuel ratio, the air/fuel ratio state of the exhaust gas becomes a state of high oxygen concentration, and in this situation, due to the three-way catalyst on the upstream side and the NOx catalyst on the downstream side, the HC and CO in the exhaust gas are oxidized and purged, and the NOx is absorbed and eliminated. Moreover, the oxygen in the exhaust gas is absorbed by these two catalysts.

Subsequently, when the engine shifts to the preset operating region, and the air/fuel ratio in the combustion chamber is feedback controlled to a target value near the theoretical air/fuel ratio, the air/fuel ratio state of the exhaust gas becomes a state corresponding substantially to the theoretical air/fuel ratio, and in this situation, the two catalysts display a three-way purification function, and the HC, CO and NOx in the exhaust gas are purged. Then, in this situation, oxygen is released by the two catalysts, but since the target value of the air/fuel ratio feedback control has been set to a value that is accordingly richer, the air/fuel ratio state in the vicinity of the catalysts does not deviate very much, and consequently, the three-way purification function of the catalysts is not harmed. Furthermore, a suitable amount of HC and CO is supplied also to the downstream NOx catalyst, so that the release and reduction purification of the NOx from the NOx catalyst is sufficiently promote.

As explained above, with the exhaust gas purifying system for an engine according to the first aspect of the present invention, a catalyst is provided that displays a three-way purification function at least when the air/fuel ratio state of the exhaust gas corresponds substantially to the theoretical air/fuel ratio, and if the engine is switched between an operating state with lean air/fuel ratio and an operating state with an air/fuel ratio that is richer than that, when the engine has shifted from an operating state with lean air/fuel ratio to an operating state with a richer air/fuel ratio, the adverse effect due to release of oxygen from the catalyst is cancelled by correcting the target value for control of the air/fuel ratio temporarily to a slightly richer state, so that the local air/fuel ratio state in the vicinity of the catalyst can be maintained at a state corresponding substantially to the theoretical air/fuel ratio. Thus, the three-way purification function of the catalyst can be maintained stable while preventing the HC and CO in the exhaust gas from blowing through and deteriorating the exhaust gas state.

With the exhaust gas purifying system for an engine in accordance with the second or third aspect of the present invention, if the engine is switched between an operating state with lean air/fuel ratio and an operating state of substantially the theoretical air/fuel ratio, when the engine is shifted from an operating state with a lean air/fuel ratio to an operating state of substantially the theoretical air/fuel ratio, the feedback control of the air/fuel ratio begins, and the target value A/F of this feedback control is corrected to 14.0 A/F<14.7, thus reliably attaining the effects of the first aspect of the present invention.

According to the fourth aspect of the present invention, the period in which the air/fuel ratio is corrected to the richer side is modified in accordance with the amount of oxygen absorbed by the catalyst, so that the air/fuel ratio state of the exhaust gas can be appropriately enriched continuously while oxygen is released from the catalyst, and the effects of the first to third aspects of the invention can be sufficiently attained.

According to the fifth aspect of the present invention, an increase in fuel efficiency is attained by not performing the correction of the air/fuel ratio when the amount of oxygen absorbed by the catalyst is very small.

According to the sixth aspect of the present invention, the NOx in the exhaust gas is absorbed by the catalyst including an NOx absorbing material, even when the air/fuel ratio in the combustion chamber is in a state that is leaner than the theoretical air/fuel ratio, so that the exhaust gas can be purified.

According to the seventh aspect of the present invention, a three-way catalyst and a catalyst including an NOx absorbing material are arranged in that order from the upstream side in the exhaust duct of an engine, an oxygen concentration sensor is arranged between them, and when, based on the signal from this oxygen concentration sensor, the oxygen concentration downstream from the three-way catalyst has actually dropped, the enriching correction of the air/fuel ratio is terminated, so that the air/fuel ratio state of the exhaust gas can be suitably enriched continuously until actually no more oxygen is released from the three-way catalyst, thereby making it possible to appropriately promote the release and reduction purification of the NOx in the downstream catalyst.

With the exhaust gas purifying system according to the eighth or ninth aspect of the present invention, if a three-way catalyst and an NOx catalyst are arranged in that order from the upstream side in the exhaust duct of an engine, when the engine has shifted from an operating state with a lean air/fuel ratio to an operating state at substantially the theoretical air/fuel ratio, a sufficient exhaust gas purification performance can be attained with the two catalysts while preventing a deterioration of the exhaust gas state caused by the release of oxygen from the two catalysts, as in the second and third aspects of the present invention.

According to the tenth aspect of the present invention, in addition to the effects of the eighth and ninth aspects of the present invention, the air/fuel ratio state of the exhaust gas can be suitably enriched continuously until actually no more oxygen is released from the three-way catalyst, so that the release and reduction purification of the NOx with the NOx catalyst can be adequately promoted, as in the seventh aspect of the present invention.

Furthermore, the exhaust gas purifying system for an engine according to the eleventh aspect of the present invention includes a catalyst having a three-way purification function near the theoretical air/fuel ratio, and under normal conditions, the engine is switched between an operating state with lean air/fuel ratio and an operating state with substantially the theoretical air/fuel ratio or richer than that, whereas if under a predetermined condition, the operation with the lean air/fuel ratio is not performed, then the control target value of the air/fuel ratio under normal conditions when the engine is operated near the theoretical air/fuel ratio is set to a value that is relatively richer than under the predetermined conditions, so that the oxygen released by the catalyst in this situation is reacted in just the right amount with the HC and CO in the exhaust gas, and a temporary deterioration of the exhaust gas state caused by the release of oxygen from the catalyst can be prevented, while suppressing a deterioration of the total fuel consumption considering all operating regions.

According to the twelfth aspect of the present invention, in a not-yet warmed-up state, the air/fuel ratio in the combustion chamber is controlled to a state of substantially the theoretical air/fuel ratio or richer than that, regardless of the operating state of the engine, thus ensuring combustion stability of the engine.

According to the thirteenth aspect of the present invention, when the catalyst is not yet activated, the target value of the air/fuel ratio feedback control is set to leaner than the theoretical air/fuel ratio, thus promoting the heating of the catalyst.

According to the fourteenth aspect of the present invention, a suitable air/fuel ratio control can be performed with the second air/fuel ratio control means, even when a sensor, actuator or the like is defective, and the control cannot be performed properly with the first air/fuel ratio control means.

According to the fifteenth aspect of the present invention, a high exhaust gas purification performance of the catalyst can be reliably ensured while maintaining combustion stability of the engine, even if the engine is in a not-yet warmed-up state, or a sensor or the like is defective.

According to the sixteenth aspect of the present invention, by arranging a three-way catalyst in the exhaust duct of the engine, and arranging an NOx catalyst downstream therefrom, a high exhaust gas purification performance can be attained, regardless of the air/fuel ratio state of the exhaust gas. On the other hand, in this case, when the engine is switched from an operating state with lean air/fuel ratio to an operating state near the theoretical air/fuel ratio, the oxygen released by the upstream three-way catalyst may lead to an adverse effect on the release and reduction purification of NOx from the downstream catalyst, so that it is very advantageous that the target value of the air/fuel ratio feedback control near the theoretical air/fuel ratio is set accordingly richer, like in the first aspect of the present invention, thus canceling the influence of the oxygen release.

These and other advantages of the present invention will become apparent to those skilled in the art upon reading and understanding the following detailed description with reference to the accompanying figures.

DETAILED DESCRIPTION OF THE INVENTION

The following is a description of preferred embodiments of the present invention, with reference to the accompanying drawings.

Embodiment 1

Figure 1:
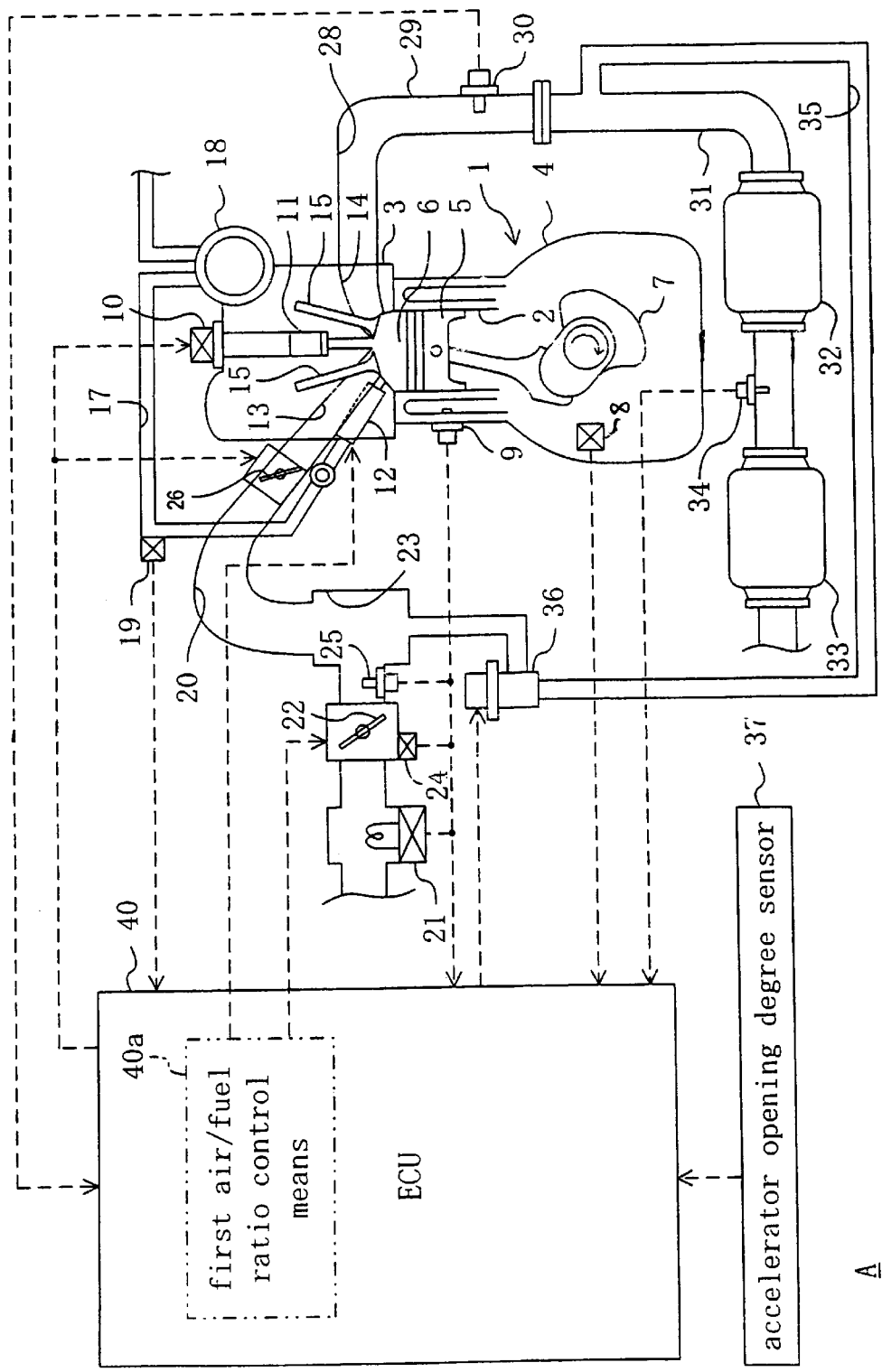
FIG. 1 shows the overall configuration of an exhaust gas purifying system for an engine in accordance with Embodiment 1 of the present invention.
Figure 2:
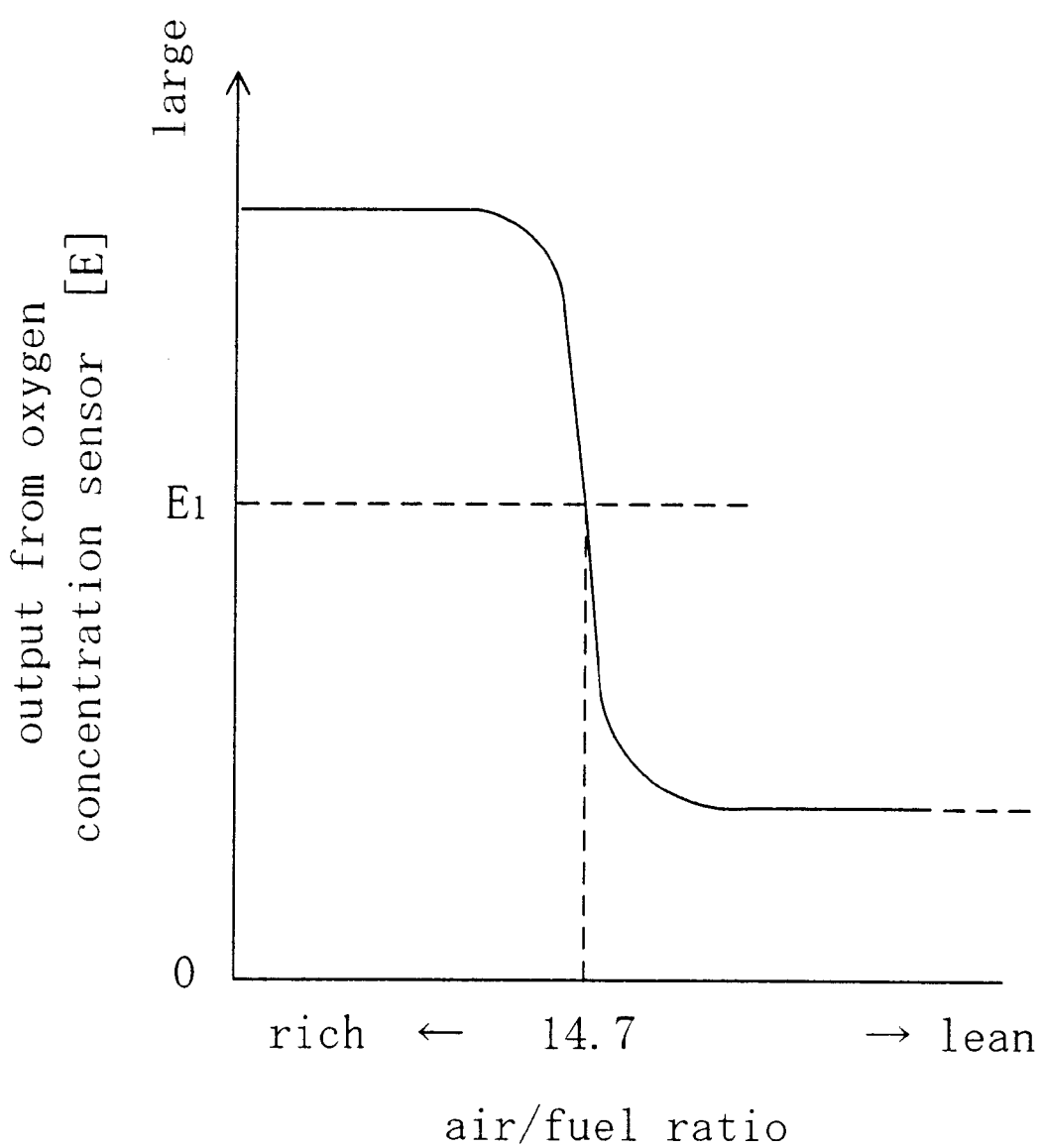
FIG. 2 illustrates the output characteristics of an oxygen concentration sensor with respect to a change in the air/fuel ratio state of the exhaust gas.

FIG. 1 shows a gas purifying system A for an engine in accordance with Embodiment 1 of the present invention. Numeral 1 denotes a multi-cylinder engine installed in a vehicle. The engine 1 includes a cylinder block 3 provided with a plurality of cylinders 2 (only one if shown in FIG. 1) that are arranged in series, and a cylinder head 4 arranged above the cylinder block 3. A piston 5 is fitted into each cylinder 2 and can move vertically up and down in FIG. 2. The top face of the piston 5 and the bottom face of the cylinder head 4 define a combustion chamber 6 inside the cylinder 2. On the other hand, a crank shaft 7 is supported rotatively below the piston 5 in the cylinder block 3, and the crank shaft 7 and the piston 5 are drivably connected to one another with a connection rod. Furthermore, on one side of the crank shaft 7, an electromagnetic crank angle sensor 8 for detecting the rotation angle of the crank shaft is provided, and a water temperature sensor 9 for detecting the cooling water temperature (engine water temperature) is provided protruding in a water jacket in the cylinder block 3.

Inside the cylinder head 4 above the combustion chamber 6 of each of the cylinders 2, a spark plug 11 connected to a spark circuit 10 is disposed on the upper portion of the combustion chamber 6, whereas an injector 12 is disposed to a peripheral portion of the combustion chamber 6, so as to directly inject and supply fuel. That is to say, even though it is not shown in detail in the drawings, the combustion chamber 6 is a so-called pent roof combustion chamber that is shaped like a roof, in which two oblique walls of the ceiling portion are held up against one another, and these oblique walls are each provided with two intake and exhaust ports 13 and 14, as well as intake and exhaust valves 15 that are provided to open and close the apertures of the intake and exhaust ports 13 and 14.

The injector 12 is placed below the two intake ports 13 so as to be sandwiched between the two intake ports 13. The front end injection hole of the injector 12 is arranged along the periphery of the combustion chamber 6, in proximity to the umbrella portion of the two intake valves 15, and injects fuel from the side into the injection chamber 6. On the other hand, the injector 12 is connected with a high-pressure fuel pump 18 via a fuel supply duct 17 that is shared by all cylinders, and fuel is supplied to the injector 12 with a high-pressure fuel pump 18 and a high-pressure regulator (not shown in the drawings) while adjusting the fuel to a suitable pressure. Furthermore, the fuel supply duct 17 is provided with a fuel pressure sensor 19 for detecting the pressure of the fuel inside (i.e. the fuel pressure).

Then, when fuel is injected by the injector 12 during the compression stroke of the cylinder 2, the fuel spray moves along an oval cavity formed at the top face of the piston 5, forming a layer of a relatively dense gas mixture near the spark plug 11. On the other hand, when fuel is injected by the injector 12 during the intake stroke of the cylinder 2, the fuel spray is dispersed throughout the combustion chamber 6, and is sufficiently mixed with the intake air, forming a substantially homogeneous gas mixture at ignition.

As shown in FIG. 1, an intake duct 20 is connected to one sidewall of the engine 1 (left sidewall in FIG. 1), so that it is in communication with the intake port 13. This intake duct 20 supplies intake air that has been filtered with an air-cleaner (not shown in the drawings) to the combustion chamber 6 of the engine 1, and is provided, in order from the upstream side to the downstream side, with a hot-wire air-flow sensor 21 detecting the amount of air that has been sucked into the engine 1, a throttle valve 22 made of a butterfly valve constricting the intake duct 20, and a surge tank 23. The throttle valve 22 is actuated electrically, without mechanical coupling to the accelerator pedal (which is not shown in the drawings), and is opened or closed by rotating the valve axis with an electromotor. Also provided are a throttle opening degree sensor 24 for detecting the opening degree of the throttle valve 22, and an intake air pressure sensor 25 for detecting the intake air pressure downstream from the throttle valve 22.

The intake duct 20, which is on the downstream side of the surge tank 23, forms individual ducts branching to each cylinder 2, and the individual ducts are again branched into two on their downstream ends, and connected to corresponding intake ports 8. A swirl control valve 26 is connected to one of the two branching paths. When the swirl control valve 26 is closed, almost all of the intake air flows only from the other branching path into the combustion chamber 6, thus creating a strong swirl in the combustion chamber 6. On the other hand, when the swirl control valve 26 is open, intake air is sucked in from both branching paths, and the tumble component of the intake air is strengthened, while the swirl component is weakened.

The other sidewall of the engine 1 (i.e. the right sidewall in FIG. 1) is connected to an exhaust duct 28, which exhausts burnt gas from the combustion chamber 6. The upstream end of the exhaust duct 28 is made of an exhaust manifold 29 branching to each of the cylinders 2 and connected to the exhaust ports 14, and a first oxygen concentration sensor 30 (detection means) detecting the oxygen concentration in the exhaust gas is arranged at a joined portion of the exhaust manifold 29. The first oxygen concentration sensor 30 is made of a so-called $\lambda O_2$-sensor whose output inverts in step-shape with the theoretical air/fuel ratio as the threshold. As shown in an example in FIG. 2, its output E (electromotive force) takes on the reference value E1 when the oxygen concentration in the exhaust air substantially corresponds to the theoretical air/fuel ratio. Lower oxygen concentrations indicate a rich state at which the output increases sharply, whereas higher oxygen concentrations indicate a lean state at which the output decreases sharply.

The joined portion of the exhaust manifold 29 is connected to the upstream end of an exhaust pipe 31, whereas the downstream end of the exhaust pipe 31 is connected to a three-way catalyst 32 and a lean NOx catalyst 33 (NOx catalyst). A second oxygen concentration sensor 34 that is also made of a $\lambda O_2$-sensor like the first oxygen concentration sensor 30 is provided on the exhaust duct 28 between these two catalysts 32 and 33. Furthermore, the upstream end of an EGR duct 35, which circulates a portion of the exhaust gas flowing down the exhaust duct 28 back into the intake system, is branchingly connected to the upstream side of the exhaust duct 31. The downstream side of the EGR duct 35 is connected to the intake duct 20 between the throttle valve 22 and the surge tank 23, and an electric EGR valve 36, whose opening degree can be adjusted, is provided nearby, making it possible to adjust the recirculation amount of exhaust gas through the EGR duct 35.

Although it is not shown in detail in the drawings, the three-way catalyst 32 on the upstream side has two catalyst layers, namely an inner catalyst layer and an outer catalyst layer, formed on the walls of a honeycomb structure made of cordierite. In the inner catalyst layer, a noble metal, such as palladium (Pd), is supported with, for example, alumina or ceria as a support material, whereas in the outer catalyst layer, platinum or rhodium are supported with ceria as the support material. Here, the ceria ($CeO_2$) functions as an oxygen absorbing material, because the valence of the cerium atoms (Ce) varies between trivalent and tetravalent, so that the crystal lattice changes, and accordingly, oxygen is absorbed or released. Conventionally, ceria is used widely, because it relieves the variations in the oxygen concentration of the exhaust gas, and improves the operation of the catalyst.

The lean NOx catalyst 33 on the downstream side is of the NOx absorbing/purifying type, and absorbs NOx in the exhaust gas in an oxygen-rich atmosphere, in which the oxygen concentration in the exhaust gas is high (for example, with an oxygen concentration of at least 4%), whereas when the oxygen concentration is, for example, less than 1 to 2%, the absorbed NOx is released and reduction purification is performed. The catalyst 33 is also of a two-layer structure, like the three-way catalyst 32, and in the inner catalyst layer, platinum and barium, which is an NOx absorbing material, are supported with alumina and ceria as a support material, whereas in the outer catalyst layer, platinum, rhodium, and barium are supported with a zeolite as a support material. It should be noted that it is also possible to use sodium, potassium, strontium, or calcium or the like instead of the barium, and it is also possible to combine two or three of those.

With the above-described configuration of the two catalysts 32 and 33, when the engine 1 operates near the theoretical air/fuel ratio, the two catalysts 32 and 33 display their three-way purification function, and purify the exhaust gas by reacting the HC, CO and NOx in the exhaust gas, whereas when the engine 1 operates at a lean air/fuel ratio (in a state of stratified combustion as explained below), the two catalysts 32 and 33 purify the exhaust gas by reacting the HC and the CO in the exhaust gas, and eliminate the NOx from the exhaust gas by absorbing it.

The ignition circuit 10, the injector 12, the motor of the throttle valve 22, the actuator of the swirl control valve 26, and the actuator of the EGR valve 36 are operated/controlled by a control unit 40 (referred to as "ECU" in the following). On the other hand, at least the various output signals from the crank angle sensor 8, the water temperature sensor 9, the air flow sensor 21, the throttle opening degree sensor 24, the intake air pressure sensor 25, and the oxygen concentration sensors 30 and 33 are input into the ECU 40, in addition to the output signals of an accelerator opening degree sensor 37 detecting the opening degree of the accelerator pedal, an intake air temperature sensor (not shown in the drawings) detecting the temperature of the intake air, and an atmospheric pressure sensor (not shown in the drawings) detecting the atmospheric pressure.

Outline of the Engine Control

As control parameters related to the engine output, the ECU 40 controls the fuel injection amount and injection timing of the injector 12, the amount of air sucked in, which is adjusted with the throttle valve 22, the intake air swirling strength, which is adjusted with the swirl control valve 26, the recirculation ratio of the exhaust gas, which is adjusted with the EGR valve 36, in accordance with the operating state of the engine 1. Then, after the engine 1 has warmed up, the form in which fuel is injected with the injector 12 is switched in accordance with the operating state, and the engine 1 is operated in either the stratified combustion state or the homogeneous combustion state.

Figure 3:
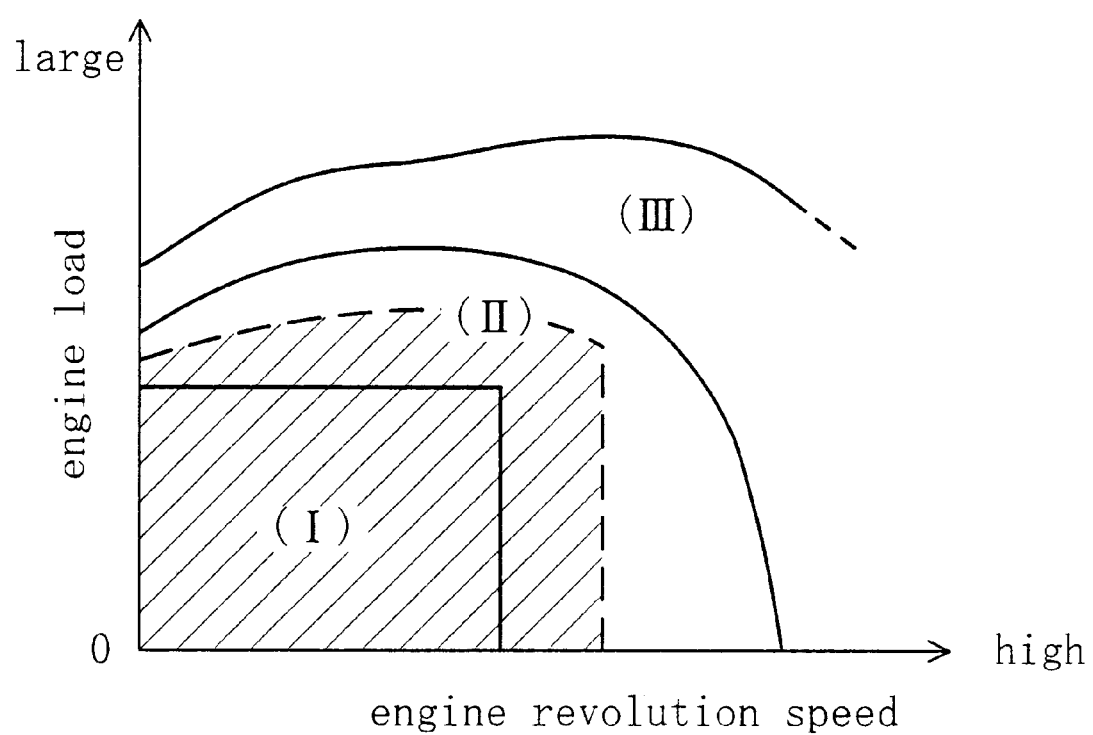
FIG. 3 shows an example of a control map setting the combustion regions after engine warm-up.

More specifically, as shown in FIG. 3, which is an example of a control map after engine warm-up, in the entire operating region of the engine 1 as defined by engine load and engine revolution speed, a predetermined operating region (I) of low revolution speed and low load is taken as the stratified combustion region. That is to say, using, as the engine load, for example the brake mean effective pressure determined from the output of the air-flow sensor 21 and the engine revolution speed, when the engine is in the load state up to about half of the entire load, and when the engine revolution speed is not more than about half the permissible maximum revolution speed, then the engine 1 is determined to be in the stratified combustion region (I).

Figure 4:
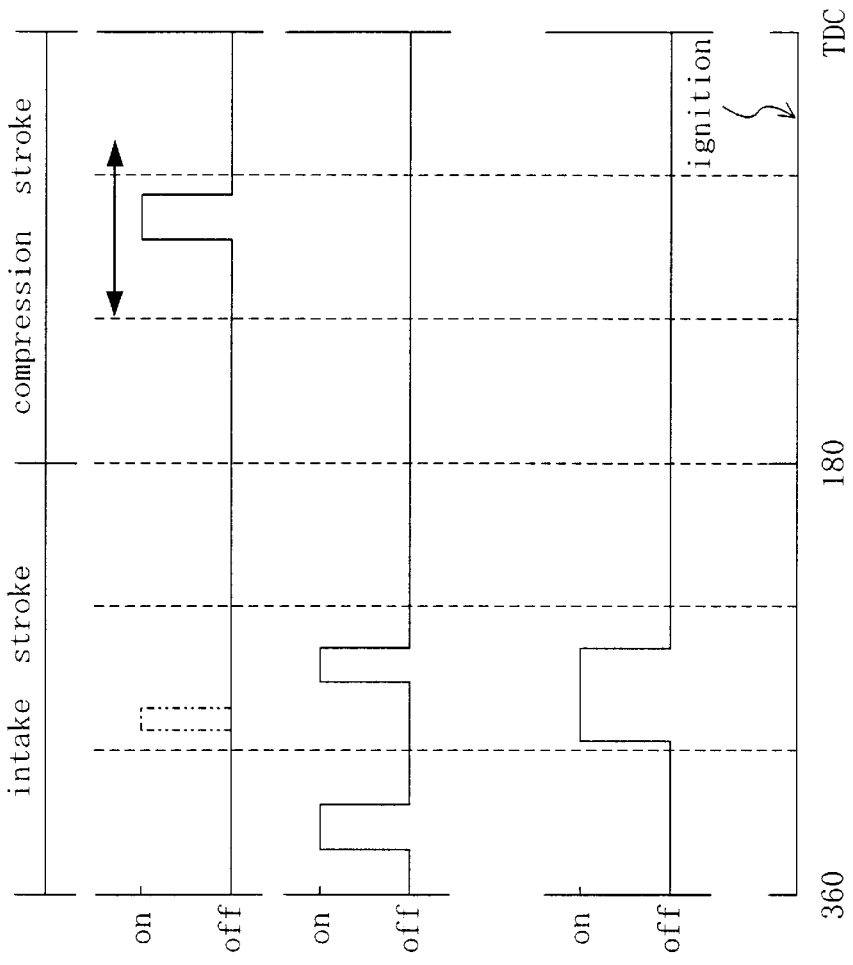
FIGS. 4A–4C schematically illustrate forms of fuel injection with the injector.

Then, as shown schematically in FIG. 4A, in this stratified combustion region (I), from the middle of the compression stroke of the cylinder 2 onward, that is, in the crank angle interval BTDC 120° CA to BTDC 35° CA indicated by the arrows in FIG. 4A, one shot of fuel is injected by the injector 12, and the gas mixture is combusted existing collectively in a stratified state near the spark plug 11. It should be noted that it is also possible to inject a portion of the fuel during the intake or the compression stroke before that crank angle interval, as indicated by the phantom line in FIG. 4A.

The operating regions (II) and (III) on the side of high revolution speeds and/or loads in FIG. 3 are both regions of homogeneous combustion, and as shown in FIGS. 4B and 4C, the injector 12 injects fuel at the intake stroke of the cylinder 2, so that the intake air is sufficiently mixed with fuel droplets, and combustion takes place after a homogeneous gas mixture has been formed in the combustion chamber 6. In particular, at the warm λ=1 region (II) (preset operating region) adjacent to the high load and/or high revolution side of the stratified combustion region (I), the fuel injection amount is subjected to feedback correction so that the air/fuel ratio of the gas mixture becomes approximately the theoretical air/fuel ratio (A/F.14.7), as will be explained in more detail below, and in the region (III) at higher revolution speed and/or higher loads, the fuel injection amount is increased even further, setting the air/fuel ratio, for example, to about A/F=12~13, and a large output corresponding to the high load is attained (in the following, this is also referred to as "warm enriched region").

On the other hand, to control the throttle valve 22, the throttle opening degree is adjusted so that the desired torque characteristics are attained, based mainly on the accelerator opening degree and the engine revolution speed. More specifically, in the stratified combustion region (I), the throttle valve 22 is opened relatively widely, in order to reduce pumping losses in the engine 1, and at that time, the average air/fuel ratio in the combustion chamber 6 takes on a very lean state of A/F=30 to 140. Furthermore, in the regions (II) and (III) of the homogeneous combustion states, the opening degree of the throttle valve 22 is relatively small.

Moreover, also the control of the swirl control valve 26 is mainly based on the accelerator opening degree and the engine revolution speed, and when the engine 1 is operated in the stratified combustion state, the opening degree of the swirl control valve 26 is set relatively small, and by creating a strong swirl flow in the combustion chamber 6, the gas mixture around the electrodes of the spark plug 11 is suitably stratified, while enhancing the gasification/atomization of the fuel that has been injected at the compression stroke of the cylinder 2. On the other hand, when the engine 1 is operated in the homogeneous combustion state, the swirl control valve 26 is opened substantially completely, and the fuel that is injected at the intake stroke of the cylinder 2 is dispersed by a strong tumbling flow, thus sufficiently mixing with the intake air.

It should be noted that in the hatched region in the control map on FIG. 3, the EGR valve 36 is opened, and a portion of the exhaust gas is recirculated to the intake duct 20 through the EGR path 35, and with this recirculation of exhaust gas, the generation of NOx can be inhibited.

Furthermore, if the engine 1 is in a state of no load or negative load, such as when the vehicle starts to decelerate for example, and if the engine revolution speed is higher than a predetermined revolution speed at which fuel cut control starts, the engine revolution speed is dropped, and until it reaches a predetermined reset revolution speed, fuel cut control is performed, in which the injection of fuel with the injector 12 of each cylinder 2 is temporarily halted. Moreover, in a state before the vehicle has warmed up, in which gasification/atomization of the fuel is difficult, the engine 1 is run in the homogeneous combustion state in all operating regions, in order to ensure stable combustion.

The operating controls for both the injector 12 and the throttle valve 22 are performed and realized on a CPU with a control program that is stored electronically in a ROM of the ECU 40. That is to say, the control procedure of the injector 12 and the throttle valve 22 after engine warm-up as described above constitutes, by software, a first air/fuel ratio control means 40a, which switches the air/fuel ratio in the combustion chamber 6 of the engine 1 such that the air/fuel ratio in the combustion chamber 6 becomes leaner than the theoretical air/fuel ratio when the engine 1 is in the stratified combustion region (I) at low revolution speed and low load, or such that the air/fuel ratio becomes substantially the theoretical air/fuel ratio when the engine is in the warm $\lambda=1$ region (II) adjacent to the stratified combustion region (I) on the side of higher revolution and/or load.

Then, when the engine 1 is in the warm $\lambda=1$ region (II), the first air/fuel ratio control means 40a feedback-controls the fuel/air ratio in the combustion chamber 6 such that it becomes substantially the theoretical air/fuel ratio, based on the signal from the first oxygen concentration sensor 30.

Control of the Fuel Injection Amount

More specifically, the ECU 40 calculates the target fuel injection amount by correcting with various correction factors a basic target fuel injection amount determined in accordance with the operating state of the engine 1, to determine the optimum fuel injection amount. That is to say, when the engine 1 is in the stratified combustion region (I), a basic target fuel injection amount is read from a map stored in the memory of the ECU 40, based on the load on the engine 1 and the engine revolution speed, determined from the accelerator opening degree or the like.

Furthermore, when the engine 1 is in region (II) or region (III) of the homogeneous combustion state, the basic target fuel injection amount is calculated, based on the charging efficiency determined from the output of the air flow sensor 21 and the engine revolution speed, such that it is e.g. substantially the theoretical air/fuel ratio if the engine is in the warm $\lambda=1$ region (II). Then, based on the basic target fuel injection amount Qb, the final target fuel injection amount Q is calculated with the following equation:

$$Q=Qb \times cdpf \times (1+cfb+ctotal)$$

In this equation, the second term on the right side, "cdpf", is a correction factor corresponding to the fuel pressure and the pressure in the cylinder. Furthermore, "cfb" in the third term on the right is a feedback correction term corresponding to the output from the first oxygen concentration sensor 30, and "ctotal", also in the third term on the right, is a correction value corresponding to the operating conditions of the engine water temperature, for example. The feedback correction value "cfb" is zero (cfb=0) when the engine 1 is in the stratified combustion region (I) or the warm enriched region (III), and the fuel injection amount is controlled by feedforward control. On the other hand, if the engine is in the warm $\lambda=1$ region (II), the feedback correction value "cfb" is updated at each control cycle in accordance with the output from the first oxygen concentration sensor 30, and thus, the amount of fuel injected with the injector 12 increases or decreases. Thus, the air/fuel ratio in the combustion chamber 6 changes periodically between lean and rich, centering around the target value near the theoretical air/fuel ratio.

Figure 5:
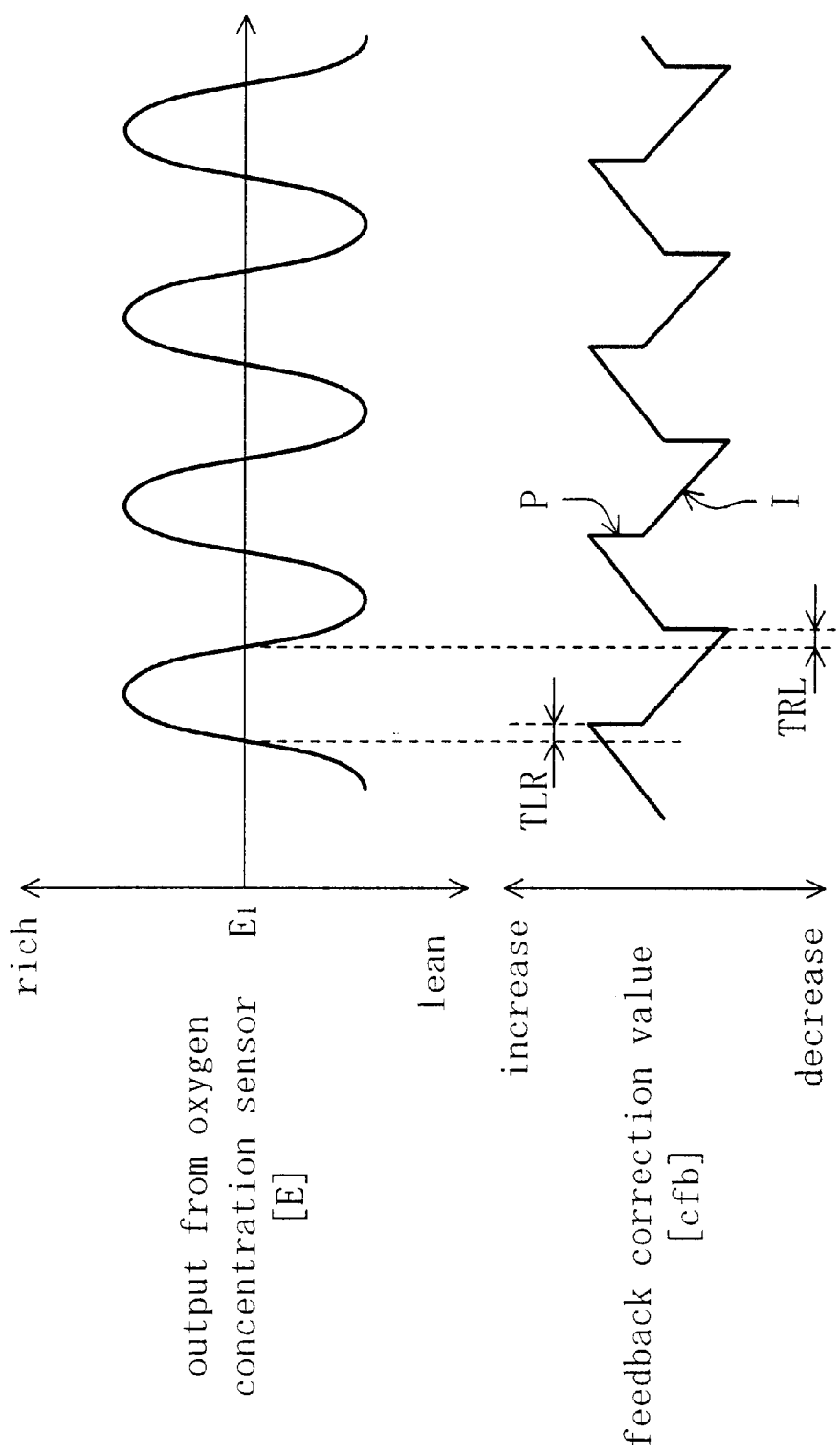
FIG. 5 is a diagram comparing the changes in the output of the oxygen sensor to changes in the feedback correction value of the fuel injection amount calculated based on that output, during air/fuel ratio feedback control with the theoretical air/fuel ratio as the target value.

More specifically, as shown schematically in FIG. 5, when the oxygen concentration in the exhaust gas is low and the output value E from the first oxygen concentration sensor 30 is on the rich side and larger than a reference value E1, then, at each control cycle, a proportional coefficient P and a integral coefficient I are subtracted from the feedback correction value "cfb", thus correcting the amount of fuel injected with the injector 12 towards the lower side. On the other hand, when the oxygen concentration in the exhaust gas is high and the output value E from the first oxygen concentration sensor 30 is on the lean side and smaller than a reference value E1, then the proportional coefficient P or the integral coefficient I are added to the feedback correction value "cfb", thus correcting the amount of injected fuel towards the higher side.

When the output of the first oxygen concentration sensor 30 inverts from the lean side to the rich side, or when it inverts from the rich side to the lean side, as described above, separate delay times TLR and TRL are set with respect to the inversion of adding to or subtracting from the feedback correction value "cfb".

Figure 6:
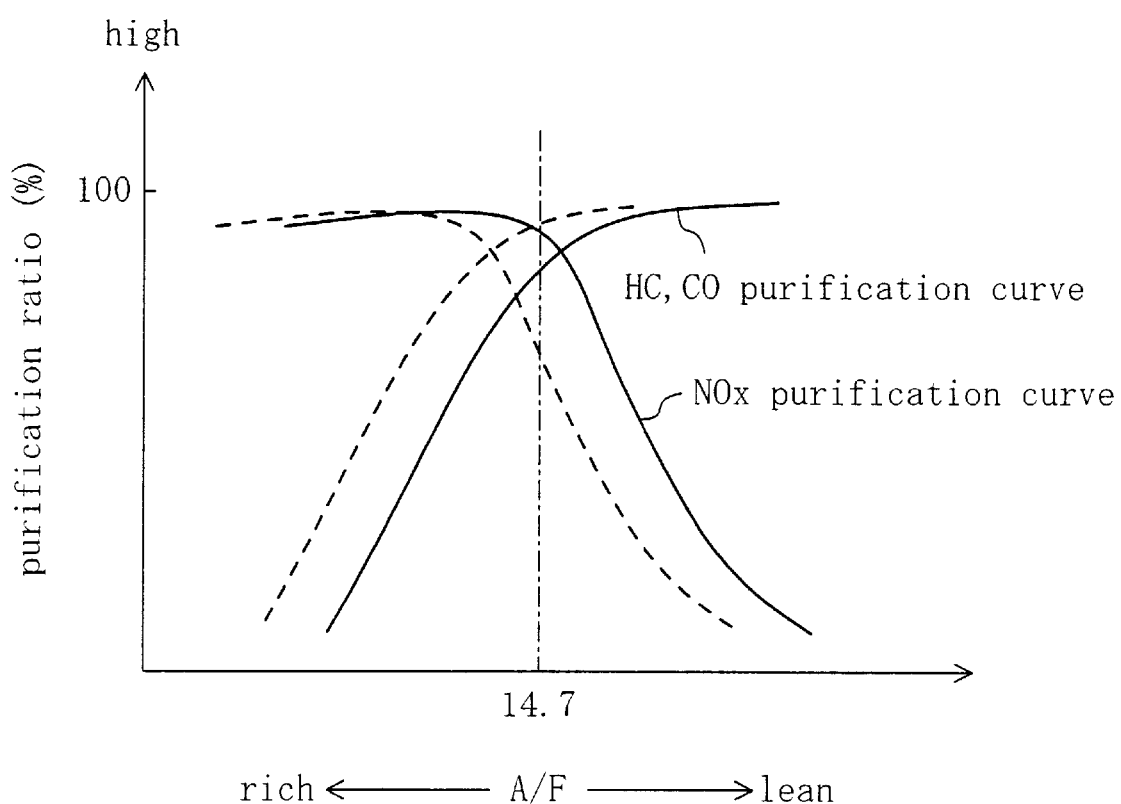
FIG. 6 is a graph showing the purification characteristics of HC, CO and NOx with the three-way catalyst and the lean NOx catalyst, in correlation with the air/fuel ratio in the combustion chamber of the engine.

Generally, when the air/fuel ratio of the exhaust gas is in a predetermined air/fuel ratio range near the theoretical air/fuel ratio, as indicated by the solid line in FIG. 6, the three-way catalyst 32 and the lean NOx catalyst 33 display a so-called three-way purification function of purging HC, CO and NOx from the exhaust gas simultaneously and very effectively. Consequently, when the engine 1 is in a regular state in the warm $\lambda=1$ region (II), the proportional coefficient P, the integral coefficient I and the delay times TLR and TRL are chosen as appropriate, and the air/fuel ratio in the combustion chamber 6 is caused to vary periodically from the rich side to the lean side around theoretical air/fuel ratio at the center, as shown in FIG. 5. That is to say, the target value of the air/fuel ratio feedback control becomes the theoretical air/fuel ratio, and HC, CO and NOx in the exhaust gas are purged almost completely.

As mentioned above, the catalysts 32 and 33 of this embodiment include ceria, which is an oxygen absorbing material, and when the engine 1 is in the stratified combustion region (I) of low revolution speed and low load, the oxygen in the exhaust gas is absorbed by the ceria, increasing the amount of absorbed oxygen. Then, when the engine 1 has shifted to the warm $\lambda=1$ region (II) or the warm enriched region (III), the ceria in the catalysts 32 and 33 releases the absorbed oxygen.

Thus, directly after the engine 1 has shifted from the stratified combustion region (I) to the warm $\lambda=1$ region (II), even though the air/fuel ratio in the combustion chamber 6 is controlled to the theoretical air/fuel ratio, the vicinity of the catalysts 32 and 33 becomes locally leaner than the theoretical air/fuel ratio due to the oxygen released by the ceria, and there is the danger that the three-way purification function of the catalysts 32 and 33 is damaged.

In particular when the three-way catalyst 32 and the lean NOx catalyst 33 are arranged in that order from the upstream side of the exhaust duct 28 as in this embodiment, the oxygen released from the three-way catalyst 32 on the upstream side reacts with the HC and CO in the exhaust gas, so that almost no HC and CO is supplied to the lean NOx catalyst 33 on the downstream side, and it may not be possible to sufficiently promote the release and the reduction purification of NOx from the lean NOx catalyst 33 on the downstream side.

In other words, when the engine 1 has shifted from the stratified combustion region (I) to the warm $\lambda=1$ region (II), considering that oxygen is released from the catalysts 32 and 33, the relation between the average air/fuel ratio in the combustion chamber 6 of the engine 1 and the purification ratio with respect to HC, CO, etc. shifts upward toward the rich side, as shown by the broken line in FIG. 6.

Therefore, as a feature of the present invention, in this embodiment, when the engine 1 has shifted from the stratified combustion region (I) to the warm $\lambda=1$ region (II), the target value of the air/fuel ratio feedback control is corrected to richer than the theoretical air/fuel ratio, until a predetermined period of time (air/fuel ratio correction period) has passed, controlling the air/fuel ratio in the combustion chamber 6 such that it is on average slightly richer than the theoretical air/fuel ratio, so that the local air/fuel ratios in the vicinity of the catalysts 32 and 33 can be maintained in an appropriate state.

Correction of Target Air/Fuel Ratio

Figure 7:
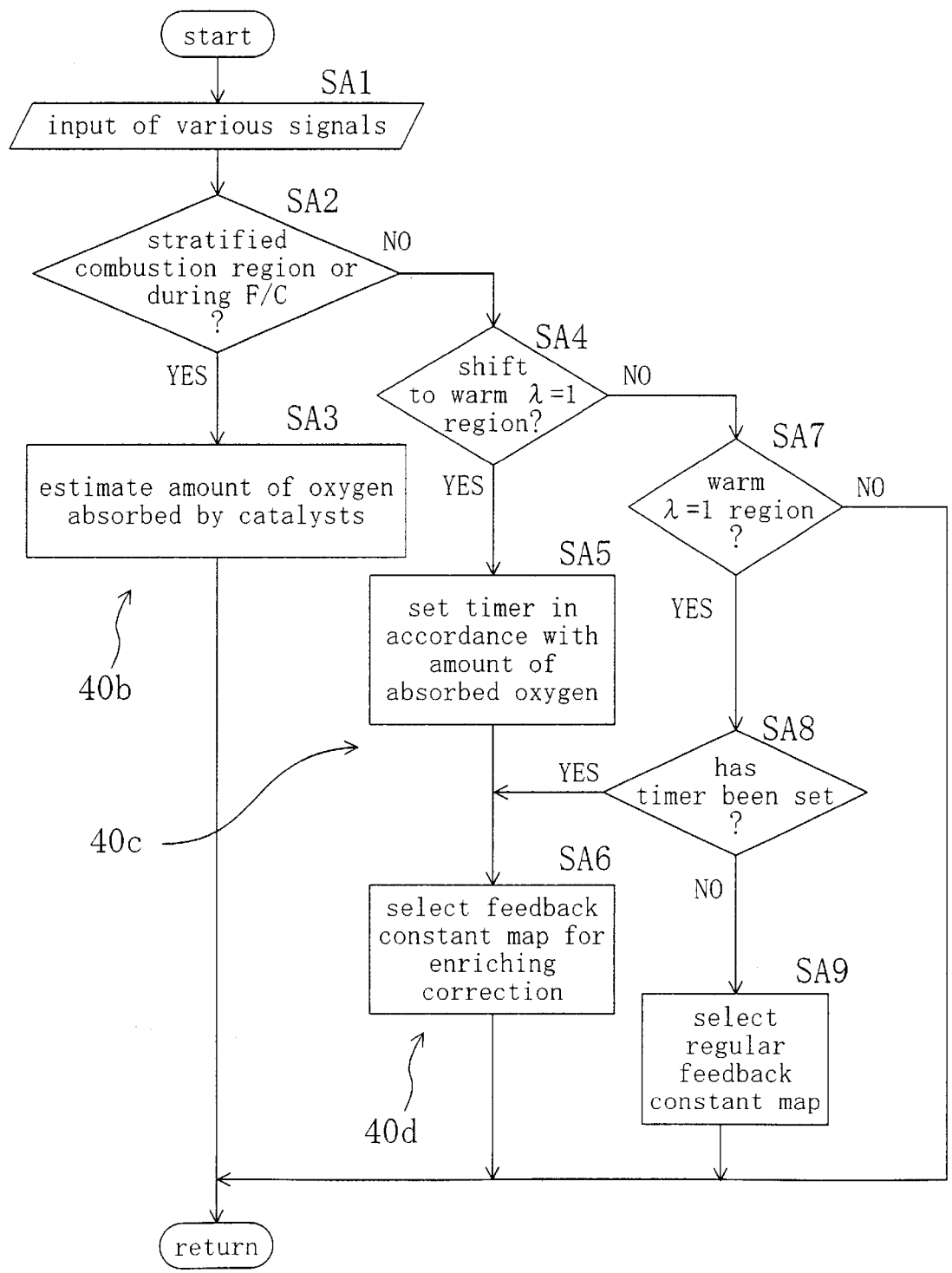
FIG. 7 is a flowchart showing a procedure for correcting the target air/fuel ratio with the ECU.

The following is an explanation of the procedure for correcting the target air/fuel ratio with the ECU 40, following the flowchart in FIG. 7. First, at Step SA1 after start, the various sensor signals, from the crank angle sensor 8, the water temperature sensor 9, the air flow sensor 21, the accelerator opening degree sensor 37, etc. are input, and various kinds of data are retrieved from the memory of the ECU 40.

Subsequently, at step SA2, it is determined, based on the load state and the engine revolution speed of the engine 1, whether the engine 1 is in the stratified combustion region (I) or during execution of fuel cut control. Then, if the engine 1 is in the stratified combustion region (I) or during execution of fuel cut control, the result of the decision is "YES", and the procedure advances to Step SA3, whereas if that is not the case, the result of the decision is "NO", and the procedure moves to Step SA4.

Subsequently, at step SA3, when the engine 1 is in the stratified combustion region (I) or during execution of fuel cut control, the amount of oxygen absorbed by the three-way catalyst 32 or the lean NOx catalyst 33 is estimated/ calculated, whereafter the procedure returns For this estimation/calculation, the amount of oxygen absorbed in one combustion cycle is determined based on the amount of air sucked in at each combustion cycle of the engine 1 as well as the state of the air/fuel ratio in the combustion chamber 6 and the oxygen absorption efficiency of the catalyst at that time, and the current amount of absorbed oxygen is determined by adding these for each combustion cycle of the engine 1.

On the other hand, if in Step SA2, it has been determined that the engine 1 is not in the stratified combustion region (I) or during execution of fuel cut control, and the procedure has advanced to Step SA4, then it is determined whether the engine 1 has just shifted from the stratified combustion region (I) to the warm $\lambda=1$ region (II). If the result of this decision is NO, then the procedure advances to Step SA7, and if the result of this decision is YES, then the procedure advances to Step SA5, and in accordance with the oxygen absorption amount of the catalyst as estimated in Step SA3, a period for correcting the target value of the air/fuel ratio feedback control to richer than the theoretical air/fuel ratio, i.e. the time corresponding to the air/fuel ratio correction period, is set with a time-measuring air/fuel ratio correction timer.

Then, at Step SA6, the feedback constant map for enriching correction of the air/fuel ratio is selected, and then the procedure returns. The feedback constant map sets, for example, the proportional coefficient P and the integral coefficient I to values that are larger than the rich side during the air/fuel ratio lean side, or set the delay timer TLR to a value that is larger than TRL, so that the center value of the air/fuel ratio, which varies periodically due to the feedback control, becomes richer than the theoretical air/fuel ratio.

Figure 8:
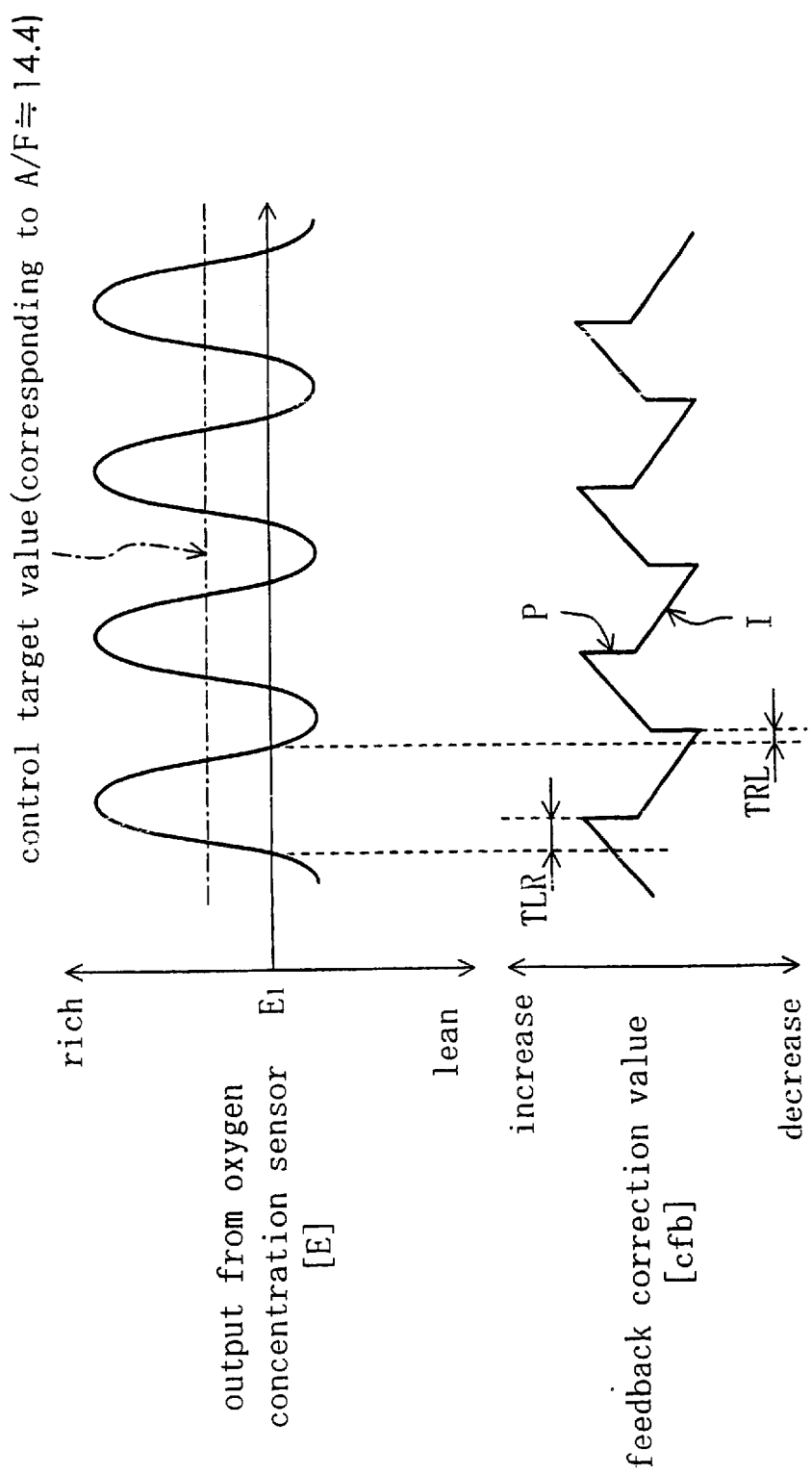
FIG. 8 is a diagram corresponding to FIG. 5 when the target air/fuel ratio is corrected to the richer side.

If the engine 1 is shifted form the stratified combustion region (I) to the warm $\lambda=1$ region (II) by selecting the feedback constant map during the enriching correction in this manner, the feedback control of the air/fuel ratio begins, and, as shown for example in FIG. 8, the air/fuel ratio in the combustion chamber 6 changes periodically, with a target value (for example, A/F=[ca.]14.4) at the center that is slightly richer than the theoretical air/fuel ratio. The target value A/F of the air/fuel ratio in this situation should be set to the range $14.0 \leq A/F\ 14.7$.

On the other hand, if it has been determined at Step SA4 that the engine 1 is not shifting from the stratified combustion region (I) to the warm $\lambda=1$ region (II) and the result is NO, and the procedure has advanced to Step SA7, then it is determined at Step SA7 whether the engine 1 is currently in the warm $\lambda=1$ region (II), and if the result of that decision is NO, then this means that the engine 1 is in the warm enriched region (III), so that the procedure returns. If the result of the decision is YES and the engine 1 is in the warm $\lambda=1$ region (II), then it is determined at the following Step SA8, whether the above-mentioned air/fuel ratio correction timer has been set.

Then, if the decision is YES and the timer has been set, the procedure advances to Step SA6, and the feedback constant map for air/fuel ratio enriching correction is selected, whereas if the timer has not been set (and the decision is NO), the procedure advances to Step SA9, and the regular feedback constant map, in which the target value of the air/fuel ratio feedback control is the theoretical air/fuel ratio (A/F=14.7), is selected, whereafter the procedure returns.

That is to say, the engine 1 shifts from the stratified combustion region (I) to the warm $\lambda=1$ region (II), and then, when it is decided by a timer count that the air/fuel ratio correction period has passed, the correction toward a richer air/fuel ratio is terminated, and the target value of the air/fuel ratio feedback control returns to the theoretical air/fuel ratio.

Step SA3 of the flowchart in FIG. 7 constitutes an oxygen absorption amount estimation means 40b for estimating the amount of oxygen absorbed by the ceria of the catalysts 32 and 33 when the engine is in the stratified combustion region (I). Furthermore, Step SA5 of the flowchart constitutes a correction period setting means 40c for modifying and setting the length of the air/fuel ratio correction period in accordance with the value estimated by the oxygen absorption amount estimation means.

Furthermore, Step SA6 of the flowchart constitutes an air/fuel ratio correction means 40d for correcting the air/fuel ratio in the combustion chamber 6 of the engine 1 temporarily so that it becomes richer than the theoretical air/fuel ratio, when the engine 1 has shifted from the stratified combustion region (I) to the warm λ=1 region (II). This air/fuel ratio correction means 40d corrects the target value A/F of the air/fuel ratio feedback control with the first air/fuel ratio control mans 40a of the ECU 40 toward richer, from the time that the engine has shifted to the warm λ=1 region (II) until the air/fuel ratio correction period has passed.

Consequently, with the exhaust gas purifying system A of this embodiment, firstly, the operating region (I) of low revolution speed and low load, at which the engine 1 is routinely operating, is taken as a stratified combustion state, and by reducing pumping losses or the like, the fuel consumption is reduced considerably. In this situation, the air/fuel ratio of the exhaust gas is very lean, like the air/fuel ratio of the combustion chamber 6 before ignition, and the NOx in the exhaust gas is absorbed by the lean NOx catalyst 33. Furthermore, a portion of the oxygen in the lean exhaust gas is absorbed by the ceria of the three-way catalyst 32 and the lean NOx catalyst 33.

Figure 9:
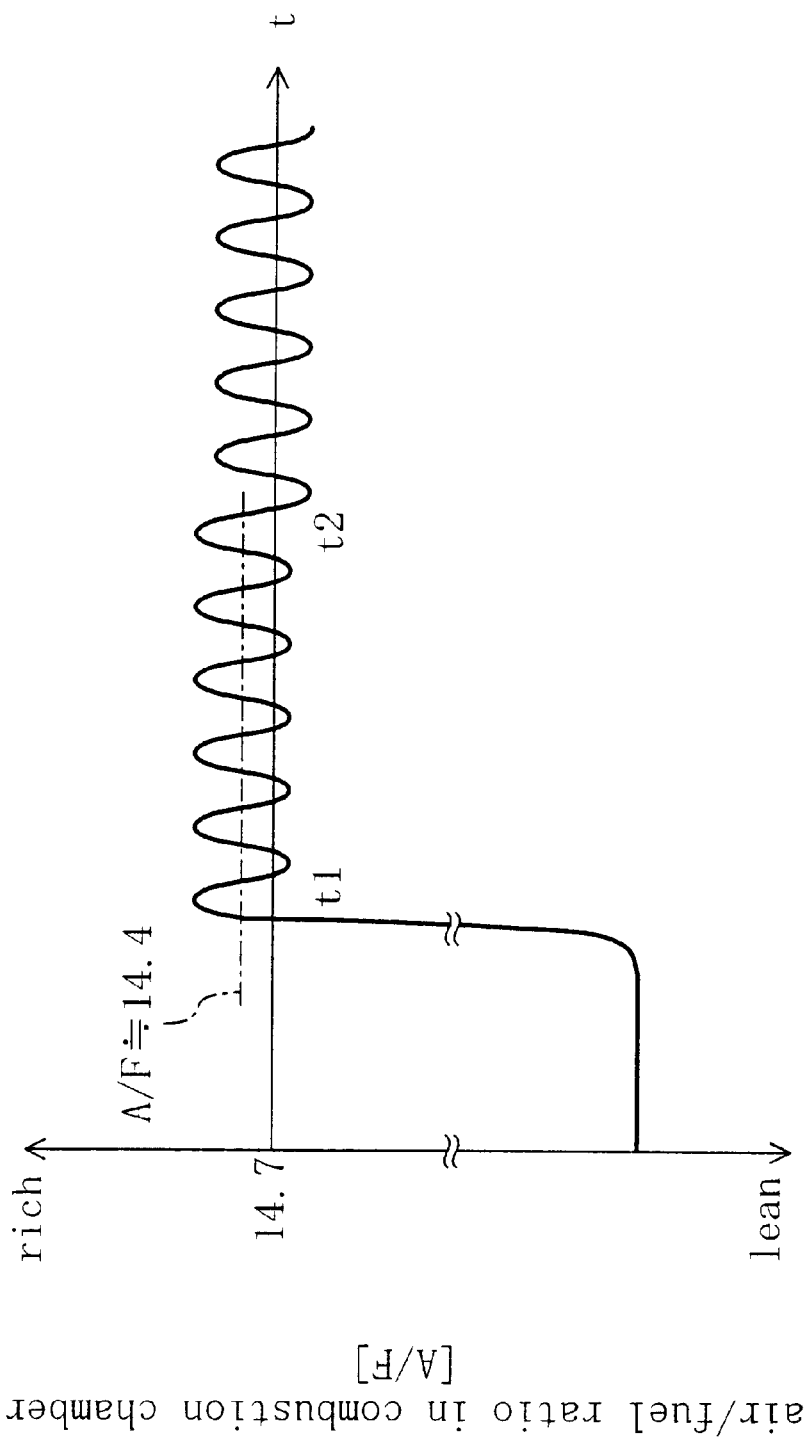
FIG. 9 is a timing chart illustrating the change of the air/fuel ratio state of the exhaust gas when the engine has shifted from the stratified combustion region to the warm $\lambda=1$ region.

Next, when the engine 1 shifts from the stratified combustion region (I) to the warm λ=1 region (II), the combustion state of the engine 1 switches from stratified combustion to homogeneous combustion, and, as shown schematically in FIG. 9, the feedback correction of the amount of fuel injected by the injector 12 begins (t=t1), and the air/fuel ratio in the combustion chamber 6 is inverted periodically to richer and leaner around a target value that is slightly richer (center A/F 14.4) than the theoretical air/fuel ratio.

Thus, the air/fuel ratio of the exhaust gas from the combustion chamber 6 becomes on average slightly richer than with the theoretical air/fuel ratio, which means that the oxygen concentration becomes low, and oxygen is released from the ceria in the catalysts 32 and 33, but as described above, the air/fuel ratio state of the exhaust gas from the combustion chamber 6 is slightly richer than the theoretical air/fuel ratio, so that as a result, the air/fuel ratio state of the exhaust gas in the vicinity of the two catalysts 32 and 33 is maintained at a value corresponding substantially to the theoretical air/fuel ratio, and a higher three-way purification function is attained with the two catalysts 32 and 33.

In this situation, the air/fuel ratio state of the exhaust gas from the combustion chamber 6 is not enriched in spike form, and the air/fuel ratio state of the exhaust gas from the combustion chamber 6 is enriched as appropriate, so as to match with the release of oxygen from the ceria in the catalysts 32 and 33, and the air/fuel ratio is controlled with high precision by feedback correction, so that it can be reliably prevented that a portion of the HC and CO in the exhaust gas is blown through the catalysts 32 and 33 and is emitted into the atmosphere.

Furthermore, as mentioned above, the air/fuel ratio state of the exhaust gas is enriched as appropriate, whereby a suitable amount of HC and CO is also supplied to the lean NOx catalyst 33 on the downstream side, so that release and reduction purification of NOx from the catalyst 33 can be promoted sufficiently.

Embodiment 2

Figure 10:
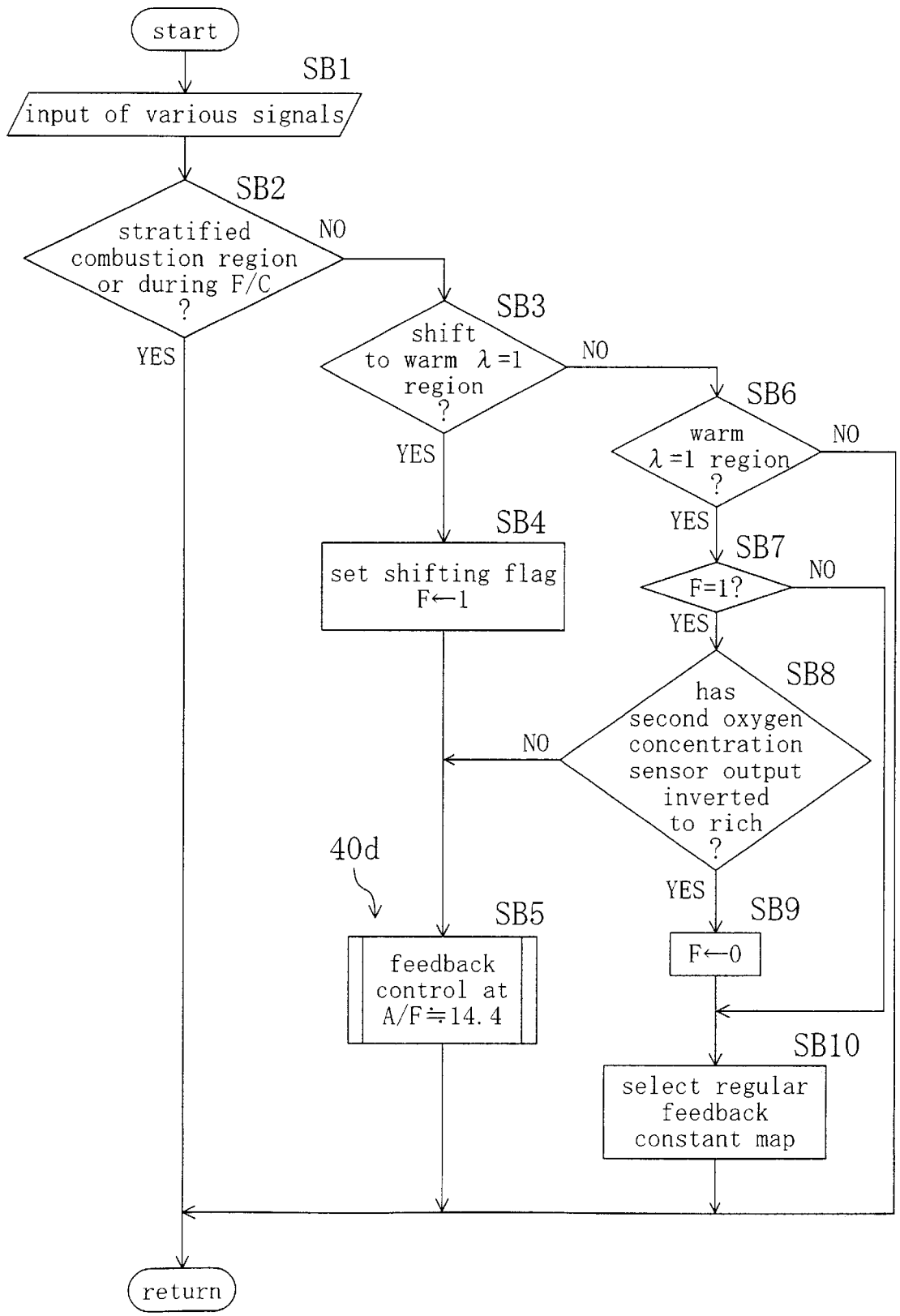
FIG. 10 is a diagram corresponding to FIG. 7 in accordance with Embodiment 2.

FIG. 10 shows a procedure for correcting the air/fuel ratio in an exhaust gas purifying system A according to an Embodiment 2 of the present invention. In this Embodiment 2, when the engine 1 shifts from the stratified combustion region (I) to the warm λ=1 region (II), feedback control is performed so that the air/fuel ratio becomes slightly richer than the theoretical air/fuel ratio, and then, when it has been detected that the oxygen concentration in the exhaust gas downstream from the three-way catalyst 32 has actually decreased, the enriching correction of the air/fuel ratio is terminated. It should be noted that the overall configuration of the exhaust gas purifying system A according to Embodiment 2 is the same as the configuration of Embodiment 1 (see FIG. 1), so that structural elements that are the same as in Embodiment have been marked by the same numerals, and their further explanation has been omitted.

More specifically, in Steps SB1 and SB2 of the flowchart in FIG. 10, the same control procedure as in Steps SA1 and SA2 of Embodiment 1 is executed, and if the engine 1 is in the stratified combustion region (I) or during execution of fuel cut control, the procedure returns, whereas if that is not the case, the procedure advances to Step SB3. Then, if it has been determined at Step SB3 that the engine 1 has just shifted from the stratified combustion region (I) to the warm λ=1 region (II) (i.e., YES), then at the following Step SB4, a shifting flag F is set (F←1), and than at Step SB5, the air/fuel ratio A/F in the combustion chamber 6 of the cylinder 2 is feed-forward controlled to A/F=[ca.]14.4, whereafter the procedure returns. That is to say, when the engine 1 has shifted from the stratified combustion region (I) to the warm λ=1 region (II), an enriching correction of the air/fuel ratio begins.

On the other hand, if it has been determined at Step SB3 that the engine 1 has not shifted from the stratified combustion region (I) to the warm λ=1 region (II) (i.e. NO), then the procedure advances to Step SB6, where it is determined whether the engine 1 is in the warm λ=1 region (II), and if the result of this decision is NO, this means that the engine is in the warm enriched region (III), so that the procedure returns. On the other hand, if the result of the decision is YES and the engine 1 is in the warm λ=1 region (II), the procedure advances to Step SB7. At Step SB7, it is determined whether the shifting flag F has been set (F=1?), and if the result of this decision is NO, the procedure advances to Step SB10, which is explained below, whereas if the result of this decision is YES and the shifting flag F has been set (F=1), then the procedure advances to Step SB8.

Then, at Step SB8, it is determined whether the output value E from the second oxygen concentration sensor 34 is equal to or higher than the reference value E1, that is, whether the sensor output has inverted from the lean side to the rich side. If the result of this decision is NO and the output of the second oxygen concentration sensor 34 has not inverted, then the procedure advances to Step SB5, where the enriching correction of the air/fuel ratio is continued, whereas if the result of the decision is YES and the output of the second oxygen concentration sensor 34 has inverted, the procedure advances to Step SB9, and the shifting flag F is cleared (F←0). Subsequently at Step SB10, the regular feedback constant map, in which the target value of the air/fuel ratio feedback control is the theoretical air/fuel ratio (A/F=14.7), is selected, whereafter the procedure returns.

Figure 11:
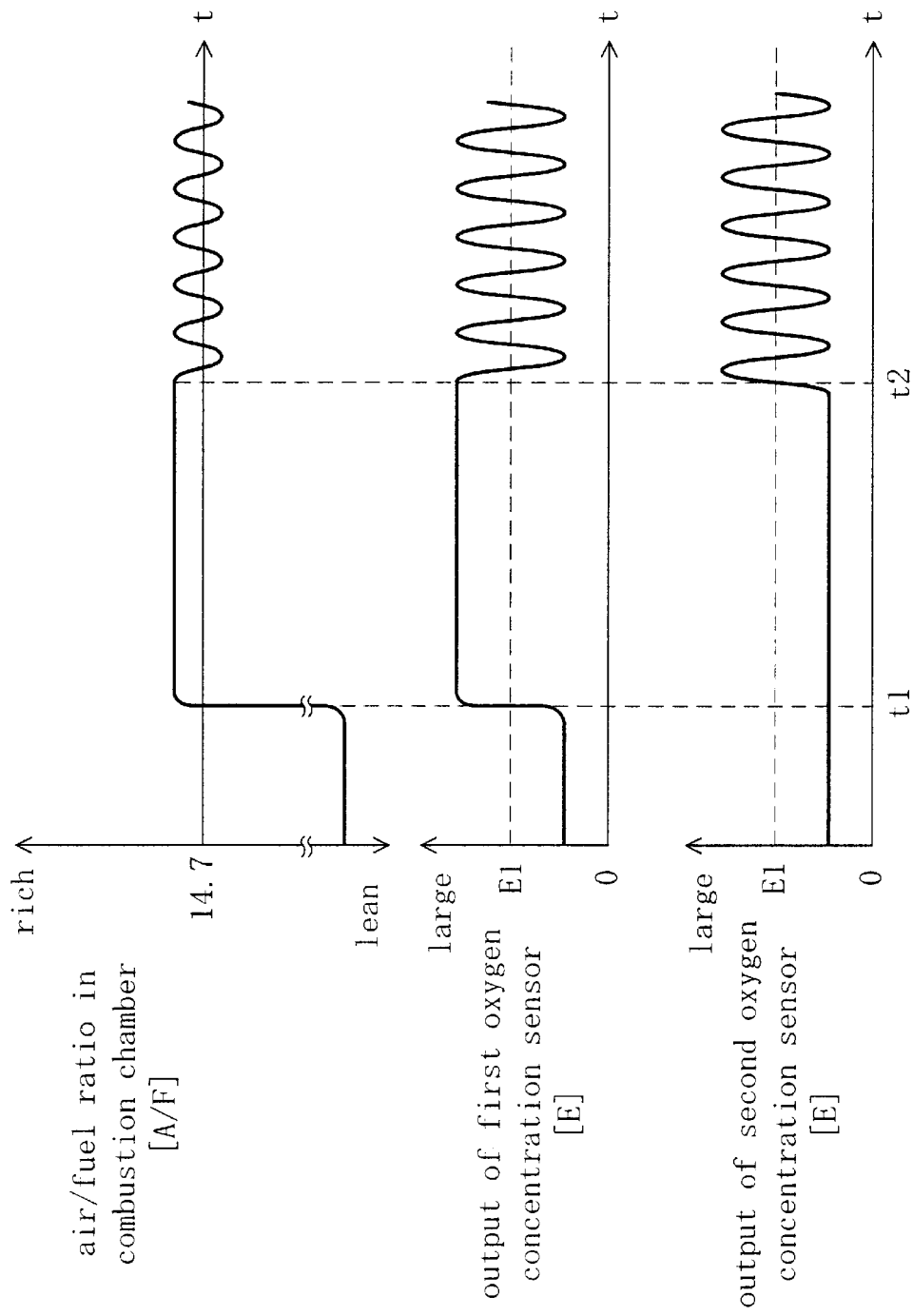
FIG. 11 is a timing chart illustrating the change of the air/fuel ratio state of the exhaust gas when the engine has shifted from the stratified combustion region to the warm $\lambda=1$ region, in comparison to the change of the outputs from the first and the second oxygen concentration sensors.

With this control, when the engine 1 has shifted from the stratified combustion region (I) to the warm λ=1 region (II) (t=t1), the air/fuel ratio state of the exhaust gas from the combustion chamber 6 becomes richer than in the state corresponding to the theoretical air/fuel ratio, and the output from the first oxygen concentration sensor 30 inverts towards rich, as shown schematically in FIG. 11. On the other hand, the oxygen concentration of the exhaust gas downstream from the three-way catalyst 32 becomes higher due to the oxygen released from the ceria of the three-way catalyst 32, and the exhaust gas becomes leaner than in the state corresponding to the theoretical air/fuel ratio, so that the output of the second oxygen concentration sensor 34 stays lower than the reference value E1, and is not inverted.

Then, when the release of oxygen from the three-way catalyst 32 is terminated, and the air/fuel ratio of the exhaust gas downstream from the three-way catalyst 32 becomes rich, the output from the second oxygen concentration sensor 34 is inverted (t=t2), and based on that, the enriching correction of the air/fuel ratio is terminated.

Step SB5 of the flowchart shown in FIG. 10 constitutes an air/fuel ratio correction means 40d for correcting the air/fuel ratio in the combustion chamber 6 of the engine 1 temporarily to a state that is richer than the theoretical air/fuel ratio, when the engine 1 has shifted from the stratified combustion region (I) to the warm $\lambda$=1 region (II). This air/fuel ratio correction means 40d is configured to terminate the correction of the air/fuel ratio when the output value E from the second oxygen concentration sensor 34 is equal to or greater than the reference value E1, that is, when the value of the oxygen concentration detected by the second oxygen concentration sensor 34 is not larger than a value preset in a range of ca. 0.5% to ca. 1%.

Consequently, with the exhaust gas purifying system A in Embodiment 2, as in Embodiment 1, when the engine 1 has shifted from the stratified combustion region (I) to the warm $\lambda$=1 region (II), an enriching correction of the air/fuel ratio is performed, such that the air/fuel ratio in the combustion chamber 6 of the engine 1 becomes slightly richer than the theoretical air/fuel ratio, whereby the three-way catalyst 32 and the lean NOx catalyst 33 display a three-way purification function and the release and the reduction purification of NOx from the lean NOx catalyst 33 can be promoted, while preventing the state of the exhaust gas from deteriorating temporarily.

Moreover, an oxygen concentration sensor 34 is arranged in the exhaust duct 28 between the three-way catalyst 32 and the lean NOx catalyst 33, and based on the output from the oxygen catalyst sensor 34, the enriching correction of the air/fuel ratio is continued until the oxygen concentration in the exhaust gas is lower than a preset value, so that while oxygen is released from the three-way catalyst 32, the air/fuel ratio state of the exhaust gas from the combustion chamber 6 is maintained at an appropriate enriched state, and the aforementioned operational effect can be attained adequately.

Embodiment 3

Figure 12:
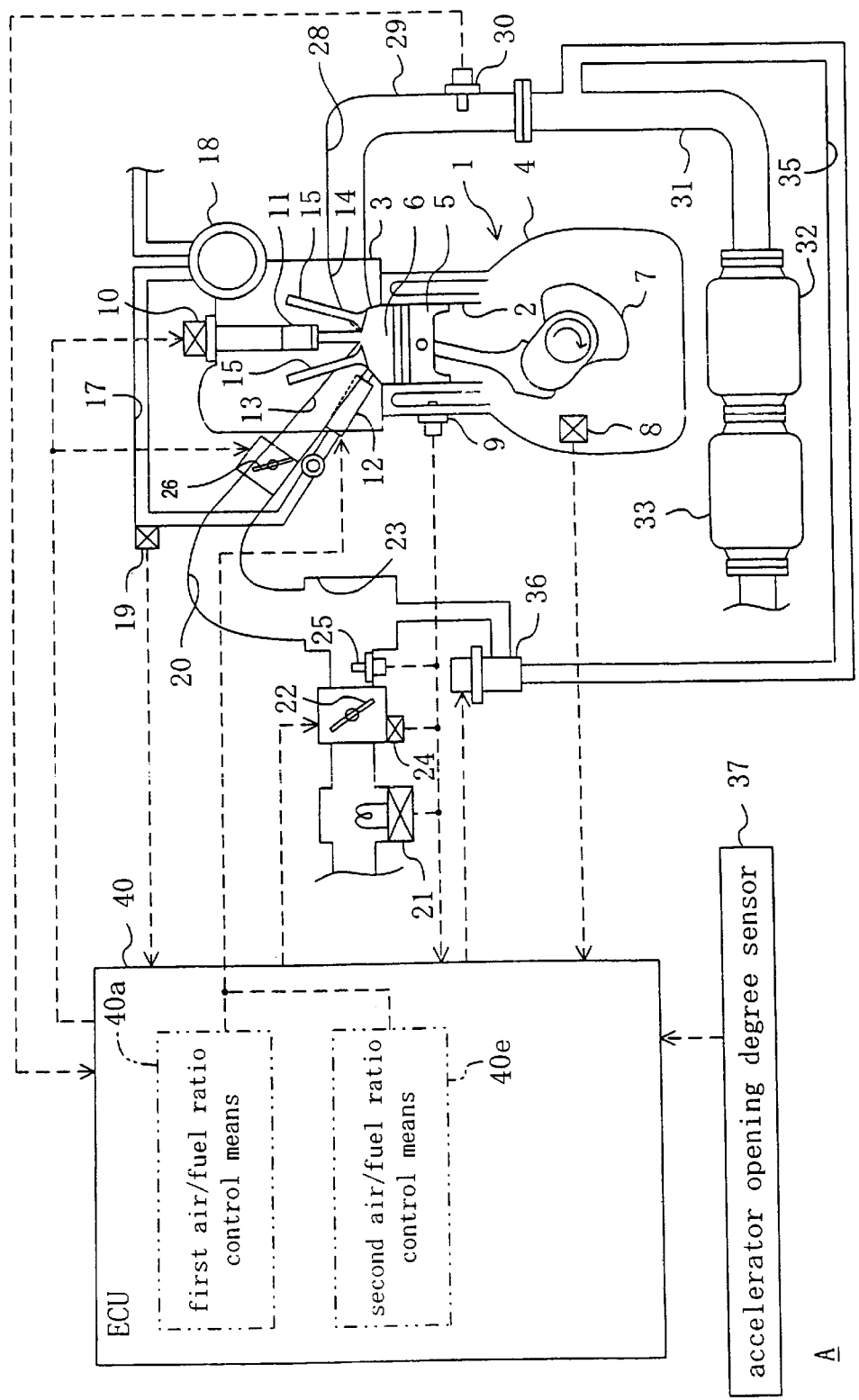
FIG. 12 is a diagram corresponding to FIG. 1 in accordance with Embodiment 3.

FIG. 12 shows an exhaust gas purifying system A for an engine in accordance with Embodiment 3 of the present invention. As in the Embodiments 1 and 2, the system according to this Embodiment 3 switches the form in which fuel is injected with the injector 12 in accordance with the operating state in a first operating mode when the engine 1 has warmed up and is in normal condition, and operates the engine in a stratified combustion state or a homogeneous combustion state. On the other hand, as a second operating mode under certain conditions, such as when the engine is not yet warmed up (i.e. the engine is cold) or defective, the engine 1 is always operated in the homogeneous combustion state. This means, other aspects of the exhaust gas purifying system A are the same as in the Embodiment 1 and 2, so that in the following, the same elements have been denoted by like numerals, and further explanations have been omitted. Furthermore, in this Embodiment 3, the second oxygen concentration sensor 34 has been omitted, but the invention is not limited to this configuration.

More specifically, in the first operating mode after engine warm-up, like in the Embodiments 1 and 2, the first air/fuel ratio control means 40a, which is configured by software in the ECU 40, controls the injector 12 and the throttle valve 22, and a predetermined operating region (I) of low revolution speeds and low loads of the engine 1 is taken as the stratified combustion region, whereas a region adjacent to that but with higher loads and/or higher revolution speeds is taken as the warm $\lambda$=1 region (II) (preset operating region), and a region (III) with even higher loads and/or higher revolution speeds is taken as the warm enriched region (see FIG. 3). Furthermore, the control of the swirl control valve 26 and the EGR valve 36 is carried out in a similar manner as in the above-described embodiments.

Figure 13:
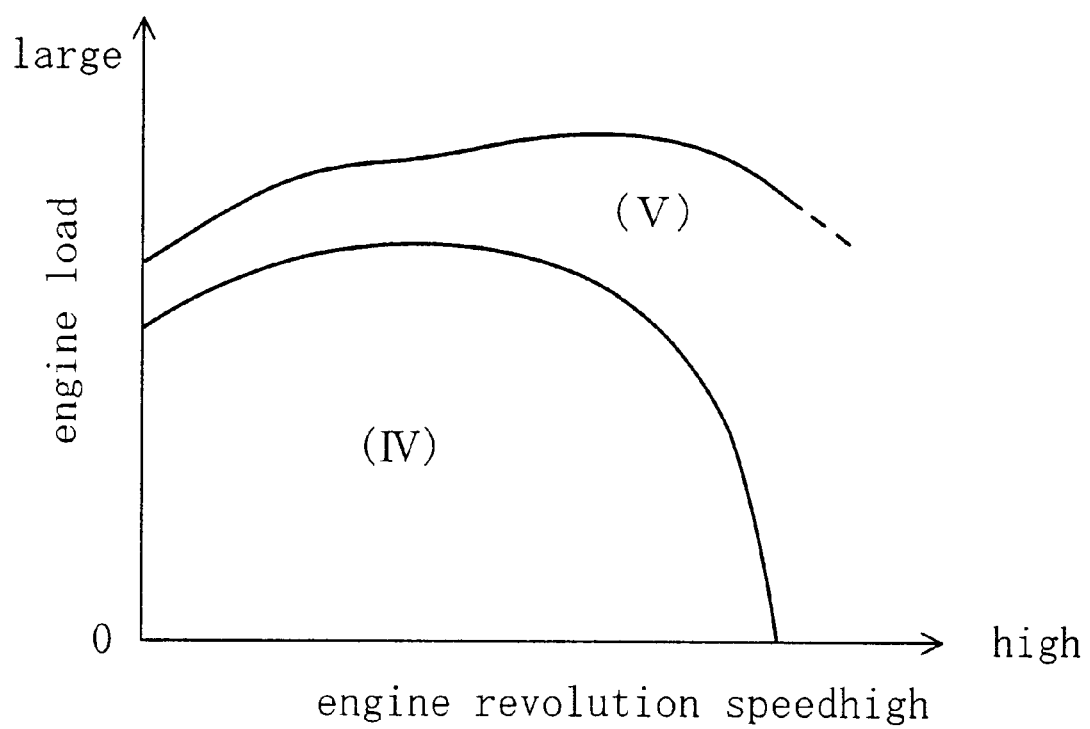
FIG. 13 is a diagram corresponding to FIG. 3 for when the engine has not-yet warmed up.

On the other hand, when the engine has not yet warmed up, the second operating mode is selected. In this situation, in order to ensure combustion stability in a state in which gasification/atomization of the fuel is difficult, the engine 1 is in a homogeneous combustion state for all operating regions, as shown in an example in FIG. 13. That is to say, as shown in FIG. 13, in a cold $\lambda$=1 region (IV) corresponding to a combination of the stratified combustion region (I) and the warm $\lambda$=1 region (II), the fuel injection ratio and the throttle opening degree are controlled such that the air/fuel ratio of the gas mixture in the combustion chamber 6 is substantially the theoretical air/fuel ratio, just like in the warm $\lambda$=1 region (II). Furthermore, in a cold enriched region (V) with higher revolution speeds and/or higher loads, the fuel injection amount is increased, so that the air/fuel ratio in the combustion chamber 6 is richer than the theoretical air/fuel ratio, just like in the warm enriched region (III).

Such a control procedure of the injector 12 and the throttle valve 22 in the second operating mode constitutes, by software, a second air/fuel ratio control means 40e, which controls the air/fuel ratio in the combustion chamber 6 of the engine 1 to substantially the theoretical air/fuel ratio or richer, prohibiting the control with the first air/fuel ratio control means 40a when the engine is in the not-yet warmed-up state.

Then, as a feature of the present invention, when the engine 1 is in the warm $\lambda$=1 region (II) after warm-up in this embodiment, the air/fuel ratio of the combustion chamber 6 is controlled to be richer than in the not-yet warmed-up cold $\lambda$=1 region (IV).

More specifically, when the engine 1 is in the warm $\lambda$=1 region (II) or the cold $\lambda$=1 region (IV), the respective feedback correction values "cfb" in the calculation of the target fuel injection amount Q are determined based on the output from the first oxygen concentration sensor 30, and the fuel injection amount is correctively increased or decreased, whereby the air/fuel ratio in the combustion chamber 6 is inverted periodically to the richer side and to the leaner side flanking the target value near the theoretical air/fuel ratio (see FIG. 5).

Here, as shown in FIG. 5, when the engine 1 is in the cold $\lambda$=1 region (IV), the proportional coefficient P, the integral coefficient I, and the delay times TLR and TRL are all set to equivalent values on the rich side and on the lean side, and thus, the air/fuel ratio in the combustion chamber 6 changes periodically to the richer side and the leaner side, with the theoretical air/fuel ratio at the center, as shown in FIG. 5. In other words, the target value of the air/fuel ratio feedback control in this situation is the theoretical air/fuel ratio.

On the other hand, when the engine 1 is in the warm $\lambda$=1 region (II), the proportional coefficient P and the integral coefficient I for example are set to be larger when the air/fuel ratio is on the lean side than when it is on the rich side, or the delay time TLR is set to be larger than TRL. Thus, as shown for example in FIG. 8, the air/fuel ratio in the combustion chamber 6 changes periodically with a target value that is slightly richer (for example A/F=14) than the theoretical air/fuel ratio at the center. That is to say, in this situation, the target value of the air/fuel ratio feedback control takes on a value that is richer than the theoretical air/fuel ratio.

In this manner, by setting the target value of the air/fuel ratio feedback control in the warm λ=1 region (II) to richer than the theoretical air/fuel ratio, in this Embodiment 3, when the engine 1 has shifted in the first operating mode from the stratified combustion region (I) to the warm λ=1 region (II), the air/fuel ratio in the combustion chamber 6 is set to be slightly richer on average than the theoretical air/fuel ratio, maintaining the local air/fuel ratio in the vicinity of the catalysts 32 and 33 at a suitable state, and when the engine 1 takes on homogeneous combustion state in the second operating mode, the target value of the air/fuel ratio feedback control in the cold λ=1 region (IV) is set to the theoretical air/fuel ratio, thus achieving an improvement in the fuel efficiency.

Selection of the Operating Mode

Figure 14:
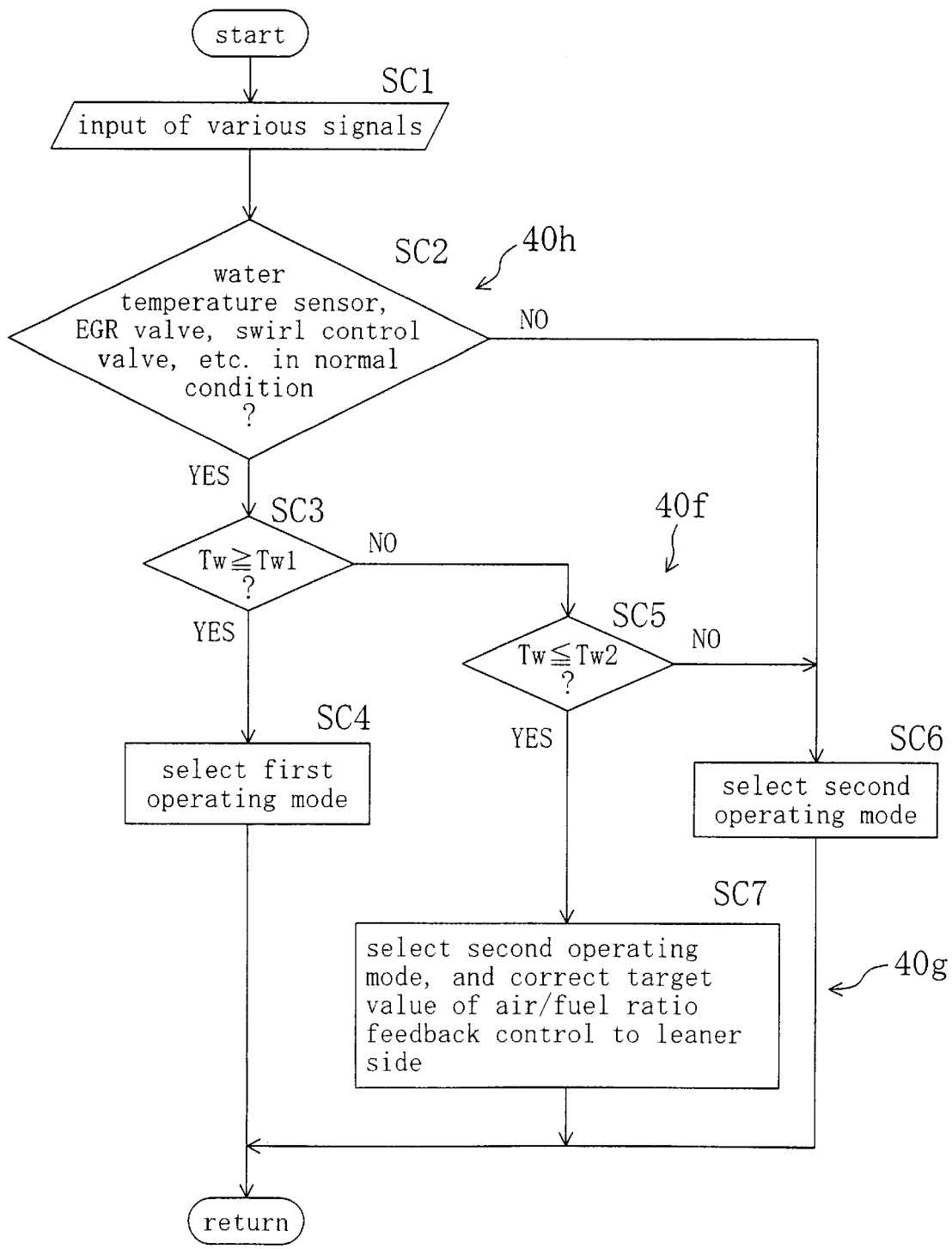
FIG. 14 is a flowchart illustrating a procedure for selecting the operating mode with the ECU.

Referring specifically to the flowchart in FIG. 14, the following is an explanation of the procedure for switching the engine 1 with the ECU 40 between the first operating mode and the second operating mode. First of all, at Step SC1 following start-up, predetermined sensor signals are input and data are read in, like in Step SA1 of Embodiment 1, and then at Step SC2, it is decided whether all sensors and actuators necessary for operating the engine 1 in the stratified combustion state, such as the water temperature sensor 9, the EGR valve 35, the swirl control valve 26, etc., are in normal condition. If the result of that decision is NO and even one of the sensors and actuators is not in normal condition, then the procedure advances to Step SC6, which is explained below, whereas if the result of that decision is YES and all sensors and actuators are in normal condition, then the procedure advances to Step SC3.

Then, at Step SC3, it is determined whether the engine water temperature Tw is equal to or higher than an engine warm-up determination temperature Tw1 (for example, 60° C.) that is preset in order to determine the warm-up state of the engine 1. If the result of this decision is NO and the engine 1 is in a not-yet warmed-up state, the procedure advances to Step SC5, whereas if the result of this decision is YES and the engine 1 has reached a warmed-up state, then the procedure advances to Step SC4, the first operating mode is selected, and the procedure returns.

That is to say, if, after engine warm-up and without any defects of the sensors etc., the engine 1 is in a state in which it can be operated in a stable stratified combustion state, the engine 1 is switched to either the stratified combustion state or the homogeneous combustion state, in accordance with the load state and the revolution speed, and the first operating mode is selected (see FIG. 3). Thus, the engine 1 can be set into the optimum combustion state in accordance with its operating state, and in particular in the stratified combustion region (I) with lower revolution speeds and lower loads, the fuel consumption can be reduced considerably.

Furthermore, at Step SC5, to which the procedure advances if the result of the decision at Step SC3 is NO, it is decided whether the engine water temperature Tw is equal to or lower than the catalyst activation determination temperature Tw2 (for example, 40° C.) that has been preset for determining the activation state of the three-way catalyst 32. Then, if the result of this decision is YES and the three-way catalyst 32 is in a low temperature state in which it is still not activated (for example, at a catalyst temperature of lower than 250° C.), the procedure advances to Step SC7, whereas if the result of this decision is NO and the three-way catalyst 32 is in a temperature state in which it is sufficiently activated, then the procedure advances to Step SC6, the second operating mode is selected, and the procedure returns.

That is to say, when the water temperature sensor 9 that is necessary for determining the warm-up state of the engine 1 is not properly operating, or when the swirl control valve 26, which is indispensable for stratifying the gas mixture, is defective, or when it is difficult to achieve a stable stratified combustion state when the engine has not yet warmed up, then the engine 1 does not take on that operating state, but the second operating mode setting the engine to a homogeneous combustion state is selected (see FIG. 13).

Moreover, at Step SC7, to which the procedure advances if the result of the decision at Step SC5 is YES, the second operating mode is selected, and in addition, the control constants for the air/fuel ratio feedback control (P, I, TLR, TRL) are corrected such that the control target value becomes leaner (A/F=15) than the theoretical air/fuel ratio, controlling the air/fuel ratio in the combustion chamber 6 to a state that is on average slightly leaner than the theoretical air/fuel ratio. That is to say, when the catalysts 32 and 33 are not yet activated, the oxygen concentration in the exhaust gas is elevated slightly, and the temperature raise of the catalysts 32 and 33 is promoted by the reaction heat from this oxygen and the unburned fuel in the exhaust gas.

Step SC5 in the flowchart shown in FIG. 14 constitutes a catalyst temperature state determination means 40f for determining whether the temperature of the three-way catalyst 32 is equal to or lower than a preset temperature (for example, 250° C.), and when the engine water temperature Tw is equal to or lower than a catalyst activation determination temperature Tw2, the catalyst temperature state determination means 40f determines that the catalyst 32 is in a low-temperature state.

Furthermore, Step SC7 of the flowchart constitutes a target value correction means 40g for correcting the target value of the air/fuel ratio feedback control of the engine 1 to a value that is leaner than the theoretical air/fuel ratio, when the catalyst temperature state determination means 40f has determined that the three-way catalyst 32 is in a low-temperature state.

Furthermore, Step SC2 of the flowchart constitutes a defect state determination means 40h for determining when at least one of the water temperature sensor 9 and the actuators for the swirl control valve 26 etc., which are necessary for operating the engine 1 in the stratified combustion state, are defective.

Consequently, with the exhaust gas purifying system A for an engine according to Embodiment 3, first, when the engine 1 is operated in the regular first operating mode after warm-up, the engine 1 is in the stratified combustion state in the commonly used wide operating region, and pumping losses are reduced, thus achieving a considerable decrease of fuel consumption. In this situation, the air/fuel ratio of the exhaust gas becomes extremely lean, just like the air/fuel ratio of the combustion chamber 6 directly before ignition, but the HC and CO in the exhaust gas is purged with two catalysts 32 and 33, and the NOx is absorbed by the lean NOx catalyst 33, so that the emission of harmful components into the atmosphere can be reduced considerably.

Furthermore, when the engine 1 temporarily shifts to the warm λ=1 region (II) with higher loads during acceleration or the like, the engine 1 is set to a homogeneous combustion state, and the air/fuel ratio in the combustion chamber is feedback controlled to a target value near the theoretical air/fuel ratio. In this situation, oxygen is released from the three-way catalyst 32, and oxygen and NOx are released from the lean NOx catalyst 33, but the target value of the air/fuel ratio feedback control is set to be richer than the theoretical air/fuel ratio, so that the air/fuel ratio of the exhaust gas is set to a suitable rich state, and HC and CO, which are the reducing components in the exhaust gas, are increased to match the release of oxygen from the catalysts 32 and 33.

That is to say, in the warm $\lambda=1$ region (II), by suitably increasing not only the total amount of oxygen released by the three-way catalyst 32 and the lean NOx catalyst 33, but, so as to match the release condition of that oxygen, also the HC and CO concentrations in the exhaust gas, the local air/fuel ratio in the vicinity of the two catalysts 32 and 33 is maintained in a range near the theoretical air/fuel ratio, and the three-way catalyst 32 and the lean NOx catalyst 33 display a three-way purification function and the release and the reduction purification of NOx from the lean NOx catalyst 33 can be sufficiently promoted.

What is more, in this warm $\lambda=1$ region (II), the concentration of the HC and CO in the exhaust gas is increased to an appropriate value, so that HC and CO do not increase abruptly, as when the air/fuel ratio is enriched in spike form, and consequently, this portion of the HC and CO is not blown through the catalyst 33 and emitted into the atmosphere. Thus, a temporary deterioration of the exhaust gas state can be avoided.

Furthermore, during normal conditions, the engine 1 is only temporarily in the warm $\lambda=1$ region (II), and when the acceleration or the like is terminated, the engine 1 returns to the stratified combustion region (I), so that even when the target value of the air/fuel ratio feedback control in the warm $\lambda=1$ region (II) is set to a value richer than the theoretical air/fuel ratio as described above, there is only a small deterioration of the fuel efficiency, considering the entire operating region of the engine 1.

On the other hand, when the engine 1 is in a not-yet warmed-up state and operated in the second operating mode, the engine 1 is in the homogeneous combustion state throughout the entire operating range, and the average air/fuel ratio in the combustion chamber 6 is in a state of substantially the theoretical air/fuel ratio or richer than that, so that oxygen is not absorbed by the catalysts 32 and 33. Therefore, the target value of the air/fuel ratio feedback control in the cold $\lambda=1$ region (IV) is set to substantially the theoretical air/fuel ratio, and in this situation, also the air/fuel ratio state of the exhaust gas in the vicinity of the catalysts 32 and 33 corresponds to the theoretical air/fuel ratio. Consequently, even when the engine 1 is not-yet warmed-up or a sensor or the like is defective, the two catalysts 32 and 33 display a sufficient three-way purification function and a stable exhaust gas purification performance can be ensured, while maintaining combustion stability of the engine 1.

Moreover, in the second operating mode, when the engine water temperature Tw is lower than the catalyst activation determination temperature Tw2, that is, when the catalysts 32 and 33 are not yet activated, the target value of the air/fuel ratio feedback control in the cold $\lambda=1$ region (I) is set to a value that is leaner than the theoretical air/fuel ratio, and thus, the heating up of the catalysts 32 and 33 is promoted, so that the exhaust gas purification performance by the catalysts 32 and 33 is quickly made available.

Other Embodiments

It should be noted that the configuration of the present invention is not limited to the Embodiments 1 to 3, and many other configuration are included in the scope of the present invention. For example, in Embodiment 1, the oxygen absorption amount of the catalyst 32 is estimated and the length of the air/fuel ratio correction period is modified in accordance with the estimated value, but when the oxygen absorption amount is very small, it is also possible to prohibit the enriching correction of the air/fuel ratio. More specifically, in Step SA5 of the flowchart in FIG. 7, it is possible to set the value of the air/fuel ratio correction timer to zero when the estimated value of the oxygen absorption amount is below a predetermined value.

That is to say, when the oxygen absorption amount in the three-way catalyst 32 is very small, the oxygen amount released by the catalyst 32 when the engine 1 shifts to the warm $\lambda=1$ region (II) is also tiny, and in this case, the fuel efficiency can on the contrary be increased by not performing an enriching correction of the air/fuel ratio. In that case, when the estimated value of the oxygen absorption amount in the catalyst 32 is lower than a predetermined value, Step SA5 constitutes a correction prohibiting means for prohibiting enriching correction of the air/fuel ratio.

Furthermore, in Embodiment 1, it is also possible to take the air/fuel ratio correction period as the period until the oxygen concentration detected by the second oxygen concentration sensor 34 has dropped to a preset value or lower, and terminate the enriching correction of the air/fuel ratio if the output of the second oxygen concentration sensor 34 inverts to the richer side before the air/fuel ratio correction timer is off.

Furthermore, in Embodiments 1 and 2, when the engine 1 is in the stratified combustion region (I), the average air/fuel ratio in the combustion chambers 6 of the cylinders 2 of the engine 1 is controlled to be leaner than the theoretical air/fuel ratio, whereas in the warm $\lambda=1$ region (II) it is controlled to be substantially at the theoretical air/fuel ratio. However, it is also possible to control the average air/fuel ratio of the combustion chambers 6 in the cylinders 2 of the engine 1 to substantially the theoretical air/fuel ratio when the engine 1 has shifted from a normal operating state to an accelerating operating states, or when the oxygen concentration in the exhaust gas is reduced on purpose to release NOx from the NOx absorbing material of the lean NOx catalyst 33 and perform reduction purification, that is, when the engine 1 is in a specified operating state within the stratified combustion region (I). Then, a temporary enriching correction of the air/fuel ratio should be performed, even when the engine 1 is in a specified operating state within the stratified combustion region (I).

Furthermore, in Embodiment 3, the target value of the air/fuel ratio feedback in the cold $\lambda=1$ region (IV) is set to the theoretical air/fuel ratio, whereas in the warm $\lambda=1$ region (II), it is set to a value richer than that, but the present invention is not limited to that, and it is also possible to set the target value of the air/fuel ratio in the cold $\lambda=1$ region (IV) to leaner than the theoretical air/fuel ratio, and to set the target value of the air/fuel ratio in the warm $\lambda=1$ region (II) to the theoretical air/fuel ratio.

In the above embodiments, the three-way catalyst 32 is arranged on the upstream side in the exhaust duct 28 of the engine 1 and the lean NOx catalyst 33 is arranged on the downstream side, but there is no limitation to this, and it is also possible to arrange the lean NOx catalyst on the upstream side and the three-way catalyst on the downstream side, or to arrange only one of the three-way catalyst and the lean NOx catalyst. Furthermore, the lean NOx catalyst 33 is not limited to an NOx absorbing/reducing catalyst as in the above embodiments, as long as it is an NOx absorbing catalyst including an NOx absorbing material.

Furthermore, in the above embodiments, the exhaust gas purifying system in accordance with the present invention is used as an exhaust gas purifying system A for the direct injection engine 1, but there is no limitation to this. That is to say, the present invention can also be applied to so-called port injection engines, in which the injectors are arranged to inject the fuel at intake ports of the engines, the air/fuel ratio is set to a lean-burn region at low revolution speeds and low loads, in which a lean-burn operation is performed in a homogeneous combustion state at an air/fuel ratio of A/F=18 to 24 in this region.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An exhaust gas purifying system for an engine, comprising;
    a catalyst provided in an exhaust duct, which is connected to a combustion chamber of the engine, and displaying a three-way purification function when an air/fuel ratio state of at least an exhaust gas corresponds substantially to a theoretical air/fuel ratio,
    wherein the catalyst is a NOx catalyst provided with an NOx absorbing material that absorbs NOx in the exhaust gas in an oxygen-rich atmosphere, and releases absorbed NOx when the oxygen concentration has dropped;
    a sensor for detecting concentration of a predetermined component of the exhaust gas upstream from the catalyst; and
    a control unit for controlling an air/fuel ratio A/F of the combusting gas mixture in the combustion chamber of the engine,
    wherein the control unit comprises:
        a first air/fuel ratio control portion for controlling the air/fuel ratio A/F in the combustion chamber by switching to either a lean state that is leaner than the theoretical air/fuel ratio or a state near the theoretical air/fuel ratio and richer than the lean state, depending on the operating state of the engine; and
        an air/fuel ratio correction portion for correcting a control target value of the air/fuel ratio A/F by the first air/fuel ratio control portion such that the control target value is slightly richer than the theoretical air/fuel ratio and within a range of $14.0 \leq A/F < 14.7$, until a predetermined air/fuel ratio correction period has passed, when the first air/fuel ratio control portion switches the air/fuel ratio A/F in the combustion chamber from the lean state to the state near the theoretical air/fuel ratio, and
    wherein the first air/fuel ratio control portion,
    controls the air/fuel ratio A/F of the combustion chamber to the lean state, when the engine is in a predetermined operating region of low revolution speeds or low loads,
    feedback controls the air/fuel ratio A/F in the combustion chamber to a predetermined target value near the theoretical air/fuel ratio, based on a signal from the sensor, when the engine is in a preset operating region of at least one of higher revolution speeds and higher loads than that predetermined operating region, and
    feedback controls the air/fuel ratio A/F of the combustion chamber to the slightly richer target value corrected by the air/fuel ratio correction portion, after the engine has shifted from the predetermined operating region to the preset operating region and until a predetermined air/fuel ratio correction period has passed.

2. An exhaust gas purifying system for an engine, comprising:
    a catalyst provided in an exhaust duct, which is connected to a combustion chamber of the engine, and displaying a three-way purification function when an air/fuel ratio state of at least an exhaust gas corresponds substantially to a theoretical air/fuel ratio,
    wherein the catalyst is a NOx catalyst provided with an NOx absorbing material that absorbs NOx in the exhaust gas in an oxygen-rich atmosphere, and releases absorbed NOx when the oxygen concentration has dropped;
    a sensor for detecting concentration of a predetermined component of the exhaust gas upstream from the catalyst; and
    a control unit for controlling an air/fuel ratio A/F of the combusting gas mixture in the combustion chamber of the engine,
    wherein the control unit comprises:
        a first air/fuel ratio control portion for controlling the air/fuel ratio A/F in the combustion chamber by switching to either a lean state that is leaner than the theoretical air/fuel ratio or a state near the theoretical air/fuel ratio and richer than the lean state, depending on the operating state of the engine; and
        an air/fuel ratio correction portion for correcting a control target value of the air/fuel ratio A/F by the first air/fuel ratio control portion such that the control target value is slightly richer than the theoretical air/fuel ratio and within a range of $14.0 \leq A/F < 14.7$, until a predetermined air/fuel ratio correction period has passed, when the first air/fuel ratio control portion switches the air/fuel ratio A/F in the combustion chamber from the lean state to the state near the theoretical air/fuel ratio, and
    wherein the first air/fuel ratio control portion basically controls the air/fuel ratio A/F in the combustion chamber to the lean state when the engine is in a predetermined operating region of low revolution speeds and low loads, and feedback controls the air/fuel ratio A/F in the combustion chamber to a predetermined target value A/F near the theoretical air/fuel ratio, based on a signal from the sensor, when the engine has entered a preset specified operating state in the predetermined operating region, and
    feedback controls the air/fuel ratio A/F of the combustion chamber to the slightly richer target value corrected by the air/fuel ratio correction portion, after the engine has entered the specified operating state in the predetermined operating region and until a predetermined air/fuel ratio correction period has passed.

3. An exhaust gas purifying system for an engine, comprising:
    a catalyst provided in an exhaust duct, which is connected to a combustion chamber of the engine, and displaying a three-way purification function when an air/fuel ratio state of at least an exhaust gas corresponds substantially to a theoretical air/fuel ratio, wherein the catalyst is a NOx catalyst provided with an NOx absorbing material that absorbs NOx in the exhaust gas in an oxygen-rich atmosphere, and releases absorbed NOx when the oxygen concentration has dropped;

a detection means of detecting concentration of predetermined component of the exhaust gas upstream from the catalyst;

a first air/fuel ratio control means for controlling an air/fuel ratio A/F of the combusting gas mixture in the combustion chamber of the engine by switching to either a lean state that is leaner than the theoretical air/fuel ratio or a state near the theoretical air fuel ratio and richer than the lean state, depending on the operating state of the engine; and an air/fuel ratio correction means for correcting a control target value air/fuel ratio A/F by the first air/fuel ratio control means such that the control target value is slightly richer than the theoretical air/fuel ratio and within a range of $14.0 \leq A/F < 14.7$, until a predetermined air/fuel ratio correction period has passed, when the first air/fuel ratio control means switches the air/fuel ratio A/F in the combustion chamber from the lean state to the state near the theoretical air/fuel ratio;

wherein the first air/fuel ratio control means controls the air/fuel ratio A/F of the combustion chamber to the lean state, when the engine is in a predetermined operating region of low revolution speeds or low loads, feedback controls the air/fuel ratio A/F in the combustion chamber to predetermined target value near the theoretical air/fuel ratio, based on a signal from the detection means, when the engine is in a preset operating region of at least one of higher revolution speeds and higher loads than that predetermined operating region, and feedback controls the air/fuel ratio A/F of the combustion chamber to the slightly richer target value corrected by the air/fuel ratio correction means, after the engine has shifted from the predetermined operating region to the preset operating region and until a predetermined air/fuel ratio correction period has passed.

4. An exhaust gas purifying system for an engine, comprising:

a catalyst provided in an exhaust duct, which is connected to a combustion chamber of the engine and displaying a three-way purification function when an air/fuel ratio state of at least an exhaust gas corresponds substantially to a theoretical air/fuel ratio, wherein the catalyst is a NOx catalyst provided with an NOx absorbing material that absorbs NOx in the exhaust gas in an oxygen-rich atmosphere, and releases absorbed NOx when the oxygen concentration has dropped;

a detection means for detecting concentration of a predetermined component of the exhaust gas upstream from the catalyst;

a first air/fuel ratio control means for controlling an air/fuel ratio A/F of the combusting gas mixture in the combustion chamber of the engine by switching to either a lean state that is leaner than the theoretical air/fuel ratio or a state near the theoretical air/fuel ratio and richer than the lean state, depending on the operating state of the engine; and an air/fuel ratio correction means for correcting a control target value of the air/fuel ratio A/F by the first air/fuel ratio control means such that the control target value is slightly richer than the theoretical air/fuel ratio and within a range of $14.0 \leq A/F < 14.7$, until a predetermined air/fuel ratio correction period has passed, when the first air/fuel ratio control means switches the air/fuel ratio A/F in the combustion chamber from the lean state to the state near the theoretical air/fuel ratio, wherein the first air/fuel ratio control means basically controls the air/fuel ratio A/F in the combustion chamber to the lean state when the engine is in a predetermined operating region of low revolution speeds and low loads, and feedback controls the air/fuel ratio A/F in the combustion chamber to a predetermined target value A/F near the theoretical air/fuel ratio, based on a signal from the detection means, when the engine has entered a preset specified operating state in the predetermined operating region; and feedback controls the air/fuel ratio A/F of the combustion chamber to the slightly richer target value corrected by the air/fuel ratio correction means, after the engine has entered the specified operating state in the predetermined operating region and until a predetermined air/fuel ratio correction period has passed.

5. The exhaust purifying system for an engine in accordance with claim 3, wherein a three-way catalyst is arranged in an exhaust duct upstream from the NOx catalyst;

wherein an oxygen concentration sensor for detecting oxygen concentration in the exhaust gas is arranged in the exhaust duct between two catalysts; and wherein the air/fuel ratio correction period is the period until the oxygen concentration detected by the oxygen concentration has dropped to a preset value or lower.

6. The exhaust gas purifying system for an engine in accordance with claim 3 or 4, further comprising:

an oxygen absorption amount estimation means for estimating the amount of oxygen absorbed by catalyst when the engine is in the predetermined operating region; and a correction period setting means for modifying and setting a length of the air/fuel ratio correction period in accordance with a value estimated by the oxygen absorption amount estimation means.

7. The exhaust gas purifying system for an engine in accordance with claim 6, further comprising:

a correction prohibiting means for prohibiting corrective control of the air/fuel ratio with the air/fuel ratio correction means when the value estimated by the oxygen absorption amount estimation means is not greater than a predetermined value.

* * * * *